(12) United States Patent
Tankovich et al.

(10) Patent No.: US 8,738,635 B2
(45) Date of Patent: May 27, 2014

(54) DETECTION OF JUNK IN SEARCH RESULT RANKING

(75) Inventors: Vladimir Tankovich, Bellevue, WA (US); Dmitriy Meyerzon, Bellevue, WA (US); Victor Poznanski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 12/791,756

(22) Filed: Jun. 1, 2010

(65) Prior Publication Data

US 2011/0295850 A1   Dec. 1, 2011

(51) Int. Cl.
*G06F 17/00*   (2006.01)
*G06F 17/30*   (2006.01)

(52) U.S. Cl.
CPC ..................... *G06F 17/30* (2013.01); *G06F 17/00* (2013.01)
USPC ........... 707/748; 707/723; 707/727; 707/749; 707/758; 715/215; 715/259

(58) Field of Classification Search
CPC ................. G06F 17/00; G06F 17/30
USPC ......... 707/609, 705–711, 726–728, 741–746, 707/723, 748, 749, 758; 709/203, 206, 709/215–220; 715/215, 233–237, 259, 968
See application file for complete search history.

(56) References Cited

U.S. PATENT DOCUMENTS 5,222,236 A   6/1993 Potash et al.
5,257,577 A   11/1993 Clark
5,321,833 A   6/1994 Chang et al.
5,369,778 A   11/1994 San Soucie et al.
5,544,360 A   8/1996 Lewak et al.
(Continued)

FOREIGN PATENT DOCUMENTS

CA   2279119         1/2001
DE   10029644 A1   1/2002
(Continued)

OTHER PUBLICATIONS

Becker, Hila et al., "Learning Similarity Metrics for Event Identification in Social Media," Published Date: Feb. 4-6, 2010 http://infolab.stanford.edu/~mor/research/becker-wsdm10.pdf.

(Continued)

*Primary Examiner* — Srirama Channavajjala
(74) *Attorney, Agent, or Firm* — Jim Sfekas; Kate Drakos; Micky Minhas

(57) ABSTRACT

Embodiments are directed to ranking search results using a junk profile. For a given corpus of documents, one or more junk profiles may be created and maintained. The junk profile provides reference metrics to represent known junk documents. For example, a junk profile may comprise a dictionary of document data that is automatically inserted into documents created using a particular system or template. A junk profile may also comprise one or more representations (e.g., histograms) of a distribution of a particular junk variable for known junk documents. The junk profile provides a usable representation of known junk documents, and the present systems and methods employ the junk profile to predict the likelihood that documents in the corpus are junk. In embodiments, junk scores are calculated and used to rank such documents higher or lower in response to a search query.

20 Claims, 5 Drawing Sheets

(56) References Cited

U.S. PATENT DOCUMENTS

| | | | |
|---|---|---|---|
| 5,594,660 | A | 1/1997 | Sung et al. |
| 5,606,609 | A | 2/1997 | Houser et al. |
| 5,634,124 | A | 5/1997 | Khoyi et al. |
| 5,729,730 | A | 3/1998 | Wlaschin et al. |
| 5,765,150 | A | 6/1998 | Burrows |
| 5,826,269 | A | 10/1998 | Hussey |
| 5,848,404 | A | 12/1998 | Hafner et al. |
| 5,870,739 | A | 2/1999 | Davis, III et al. |
| 5,870,740 | A | 2/1999 | Rose et al. |
| 5,890,147 | A | 3/1999 | Peltonen et al. |
| 5,893,092 | A | 4/1999 | Driscoll |
| 5,893,116 | A | 4/1999 | Simmonds et al. |
| 5,905,866 | A | 5/1999 | Nakabayashi et al. |
| 5,913,210 | A | 6/1999 | Call |
| 5,920,859 | A | 7/1999 | Li |
| 5,933,822 | A | 8/1999 | Braden-Harder et al. |
| 5,933,851 | A | 8/1999 | Kojima et al. |
| 5,943,670 | A | 8/1999 | Prager |
| 5,956,722 | A | 9/1999 | Jacobson et al. |
| 5,960,383 | A | 9/1999 | Fleischer |
| 5,983,216 | A | 11/1999 | Kirsch et al. |
| 5,987,457 | A | 11/1999 | Ballard |
| 6,006,225 | A | 12/1999 | Bowman et al. |
| 6,012,053 | A | 1/2000 | Pant et al. |
| 6,026,398 | A | 2/2000 | Brown et al. |
| 6,029,164 | A | 2/2000 | Birrell et al. |
| 6,032,196 | A | 2/2000 | Monier |
| 6,038,610 | A | 3/2000 | Belfiore et al. |
| 6,041,323 | A | 3/2000 | Kubota |
| 6,070,158 | A | 5/2000 | Kirsch et al. |
| 6,070,191 | A | 5/2000 | Narendran et al. |
| 6,098,064 | A | 8/2000 | Pirolli et al. |
| 6,115,709 | A | 9/2000 | Gilmour et al. |
| 6,125,361 | A | 9/2000 | Chakrabarti et al. |
| 6,128,701 | A | 10/2000 | Malcolm et al. |
| 6,145,003 | A | 11/2000 | Sanu et al. |
| 6,151,624 | A | 11/2000 | Teare et al. |
| 6,167,369 | A | 12/2000 | Schulze |
| 6,167,402 | A | 12/2000 | Yeager |
| 6,178,419 | B1 | 1/2001 | Legh-Smith et al. |
| 6,182,065 | B1 | 1/2001 | Yeomans |
| 6,182,067 | B1 | 1/2001 | Presnell et al. |
| 6,182,085 | B1 | 1/2001 | Eichstaedt et al. |
| 6,182,113 | B1 | 1/2001 | Narayanaswami |
| 6,185,558 | B1 | 2/2001 | Bowman et al. |
| 6,199,081 | B1 | 3/2001 | Meyerzon et al. |
| 6,202,058 | B1 | 3/2001 | Rose et al. |
| 6,208,988 | B1 | 3/2001 | Schultz |
| 6,216,123 | B1 | 4/2001 | Robertson et al. |
| 6,222,559 | B1 | 4/2001 | Asano et al. |
| 6,240,407 | B1 | 5/2001 | Chang et al. |
| 6,240,408 | B1 | 5/2001 | Kaufman |
| 6,247,013 | B1 | 6/2001 | Morimoto |
| 6,263,364 | B1 | 7/2001 | Najork et al. |
| 6,269,370 | B1 | 7/2001 | Kirsch |
| 6,272,507 | B1 | 8/2001 | Pirolli et al. |
| 6,285,367 | B1 | 9/2001 | Abrams et al. |
| 6,285,999 | B1 | 9/2001 | Page |
| 6,304,864 | B1 | 10/2001 | Liddy et al. |
| 6,314,421 | B1 | 11/2001 | Sharnoff et al. |
| 6,317,741 | B1 | 11/2001 | Burrows |
| 6,324,551 | B1 | 11/2001 | Lamping et al. |
| 6,326,962 | B1 | 12/2001 | Szabo |
| 6,327,590 | B1 | 12/2001 | Chidlovskii |
| 6,336,117 | B1 | 1/2002 | Massarani et al. |
| 6,349,308 | B1 | 2/2002 | Whang et al. |
| 6,351,467 | B1 | 2/2002 | Dillon |
| 6,351,755 | B1 | 2/2002 | Najork et al. |
| 6,360,215 | B1 | 3/2002 | Judd et al. |
| 6,381,597 | B1 | 4/2002 | Lin |
| 6,385,602 | B1 | 5/2002 | Tso et al. |
| 6,389,436 | B1 | 5/2002 | Chakrabarti et al. |
| 6,415,319 | B1 | 7/2002 | Ambroziak |
| 6,418,433 | B1 | 7/2002 | Chakrabarti et al. |
| 6,418,452 | B1 | 7/2002 | Kraft et al. |
| 6,418,453 | B1 | 7/2002 | Kraft et al. |
| 6,424,966 | B1 | 7/2002 | Meyerzon et al. |
| 6,442,606 | B1 | 8/2002 | Subbaroyan et al. |
| 6,473,752 | B1 | 10/2002 | Fleming |
| 6,484,204 | B1 | 11/2002 | Rabinovich |
| 6,516,312 | B1 | 2/2003 | Kraft et al. |
| 6,526,440 | B1 | 2/2003 | Bharat |
| 6,539,376 | B1 | 3/2003 | Sundaresan et al. |
| 6,546,388 | B1 | 4/2003 | Edlund et al. |
| 6,547,829 | B1 | 4/2003 | Meyerzon et al. |
| 6,549,896 | B1 | 4/2003 | Candan et al. |
| 6,549,897 | B1 | 4/2003 | Katariya et al. |
| 6,553,364 | B1 | 4/2003 | Wu |
| 6,557,036 | B1 | 4/2003 | Kavacheri et al. |
| 6,560,600 | B1 | 5/2003 | Broder |
| 6,594,682 | B2 | 7/2003 | Peterson et al. |
| 6,598,040 | B1 | 7/2003 | Cragun et al. |
| 6,598,047 | B1 | 7/2003 | Russell et al. |
| 6,598,051 | B1 | 7/2003 | Wiener et al. |
| 6,601,075 | B1 | 7/2003 | Huang et al. |
| 6,622,140 | B1 | 9/2003 | Kantrowitz |
| 6,628,304 | B2 | 9/2003 | Mitchell et al. |
| 6,631,369 | B1 | 10/2003 | Meyerzon et al. |
| 6,633,867 | B1 | 10/2003 | Kraft et al. |
| 6,633,868 | B1 | 10/2003 | Min |
| 6,636,853 | B1 | 10/2003 | Stephens |
| 6,638,314 | B1 | 10/2003 | Meyerzon et al. |
| 6,654,742 | B1 | 11/2003 | Kobayashi et al. |
| 6,671,683 | B2 | 12/2003 | Kanno |
| 6,678,692 | B1 | 1/2004 | Hyatt |
| 6,701,318 | B2 | 3/2004 | Fox et al. |
| 6,718,324 | B2 | 4/2004 | Edlund et al. |
| 6,718,365 | B1 | 4/2004 | Dutta |
| 6,738,764 | B2 | 5/2004 | Mao et al. |
| 6,763,362 | B2 | 7/2004 | McKeeth |
| 6,766,316 | B2 | 7/2004 | Caudill et al. |
| 6,766,422 | B2 | 7/2004 | Beyda |
| 6,772,141 | B1 | 8/2004 | Pratt et al. |
| 6,775,659 | B2 | 8/2004 | Clifton-Bligh |
| 6,775,664 | B2 | 8/2004 | Lang et al. |
| 6,778,997 | B2 | 8/2004 | Sundaresan et al. |
| 6,829,606 | B2 | 12/2004 | Ripley |
| 6,859,800 | B1 | 2/2005 | Roche et al. |
| 6,862,710 | B1 | 3/2005 | Marchisio |
| 6,868,411 | B2 | 3/2005 | Shanahan |
| 6,871,202 | B2 | 3/2005 | Broder |
| 6,873,982 | B1 | 3/2005 | Bates et al. |
| 6,883,135 | B1 | 4/2005 | Obata et al. |
| 6,886,010 | B2 | 4/2005 | Kostoff |
| 6,886,129 | B1 | 4/2005 | Raghavan et al. |
| 6,898,592 | B2 | 5/2005 | Peltonen et al. |
| 6,910,029 | B1 | 6/2005 | Sundaresan |
| 6,931,397 | B1 | 8/2005 | Sundaresan |
| 6,934,714 | B2 | 8/2005 | Meinig |
| 6,944,609 | B2 | 9/2005 | Witbrock |
| 6,947,930 | B2 | 9/2005 | Anick et al. |
| 6,959,326 | B1 | 10/2005 | Day et al. |
| 6,973,490 | B1 | 12/2005 | Robertson et al. |
| 6,990,628 | B1 | 1/2006 | Palmer et al. |
| 6,999,959 | B1* | 2/2006 | Lawrence et al. ............ 1/1 |
| 7,003,442 | B1* | 2/2006 | Tsuda ........................ 704/9 |
| 7,010,532 | B1 | 3/2006 | Stakutis et al. |
| 7,016,540 | B1 | 3/2006 | Gong et al. |
| 7,028,029 | B2 | 4/2006 | Kamvar et al. |
| 7,039,234 | B2 | 5/2006 | Geidl et al. |
| 7,051,023 | B2 | 5/2006 | Kapur et al. |
| 7,065,523 | B2 | 6/2006 | Peltonen et al. |
| 7,072,888 | B1 | 7/2006 | Perkins |
| 7,076,483 | B2 | 7/2006 | Preda et al. |
| 7,080,073 | B1 | 7/2006 | Jiang et al. |
| 7,085,755 | B2 | 8/2006 | Bluhm et al. |
| 7,107,218 | B1 | 9/2006 | Preston |
| 7,152,059 | B2 | 12/2006 | Monteverde |
| 7,181,438 | B1 | 2/2007 | Szabo |
| 7,197,497 | B2 | 3/2007 | Cossock |
| 7,228,301 | B2 | 6/2007 | Meyerzon et al. |
| 7,231,399 | B1 | 6/2007 | Bem et al. |
| 7,243,102 | B1 | 7/2007 | Naam et al. |
| 7,246,128 | B2 | 7/2007 | Jordahl |

(56) References Cited

U.S. PATENT DOCUMENTS

| | | |
|---|---|---|
| 7,257,574 B2 | 8/2007 | Parikh |
| 7,257,577 B2 | 8/2007 | Fagin et al. |
| 7,260,573 B1 | 8/2007 | Jeh et al. |
| 7,281,002 B2 | 10/2007 | Farrell |
| 7,283,997 B1 | 10/2007 | Howard, Jr. et al. |
| 7,308,643 B1 | 12/2007 | Zhu et al. |
| 7,328,401 B2 | 2/2008 | Obata et al. |
| 7,346,604 B1 | 3/2008 | Bharat et al. |
| 7,346,839 B2 | 3/2008 | Acharya et al. |
| 7,356,530 B2 | 4/2008 | Kim et al. |
| 7,386,527 B2 | 6/2008 | Harris et al. |
| 7,415,459 B2 | 8/2008 | Peltonen et al. |
| 7,428,530 B2 | 9/2008 | Ramaranthnam et al. |
| 7,496,561 B2 | 2/2009 | Caudill et al. |
| 7,499,919 B2 | 3/2009 | Meyerzon et al. |
| 7,519,529 B1 | 4/2009 | Horvitz |
| 7,580,568 B1 | 8/2009 | Wang et al. |
| 7,584,221 B2 | 9/2009 | Robertson et al. |
| 7,599,917 B2 | 10/2009 | Meyerzon et al. |
| 7,603,616 B2 | 10/2009 | Obata et al. |
| 7,606,793 B2 | 10/2009 | Merrigan et al. |
| 7,644,107 B2 | 1/2010 | Neagovici-Negoescu et al. |
| 7,685,084 B2 | 3/2010 | Sisk et al. |
| 7,689,531 B1 | 3/2010 | Diao et al. |
| 7,689,559 B2 | 3/2010 | Canright et al. ............... 707/7 |
| 7,693,829 B1* | 4/2010 | Alshawi ............... 707/999.003 |
| 7,716,198 B2 | 5/2010 | Meyerzon et al. |
| 7,716,225 B1 | 5/2010 | Dean et al. |
| 7,716,226 B2 | 5/2010 | Barney |
| 7,720,830 B2 | 5/2010 | Wen et al. |
| 7,739,277 B2 | 6/2010 | Meyerzon et al. |
| 7,761,448 B2 | 7/2010 | Meyerzon et al. |
| 7,792,833 B2 | 9/2010 | Meyerzon et al. |
| 7,827,181 B2 | 11/2010 | Petriuc |
| 7,840,569 B2 | 11/2010 | Meyerzon et al. |
| 7,962,462 B1 | 6/2011 | Lamping et al. |
| 8,082,246 B2 | 12/2011 | Meyerzon et al. |
| 8,326,829 B2 | 12/2012 | Gupta |
| 8,370,331 B2 | 2/2013 | Pontier et al. |
| 8,412,702 B2 | 4/2013 | Cozzi |
| 8,412,717 B2 | 4/2013 | Liao et al. |
| 2001/0042076 A1 | 11/2001 | Fukuda |
| 2002/0016787 A1 | 2/2002 | Kanno |
| 2002/0026390 A1 | 2/2002 | Ulenas et al. |
| 2002/0032772 A1 | 3/2002 | Olstad et al. |
| 2002/0055940 A1 | 5/2002 | Elkan |
| 2002/0062323 A1 | 5/2002 | Takatori et al. |
| 2002/0078045 A1 | 6/2002 | Dutta |
| 2002/0083054 A1 | 6/2002 | Peltonen et al. |
| 2002/0099694 A1 | 7/2002 | Diamond et al. |
| 2002/0103798 A1 | 8/2002 | Abrol et al. |
| 2002/0107861 A1 | 8/2002 | Clendinning et al. |
| 2002/0107886 A1 | 8/2002 | Gentner et al. |
| 2002/0123988 A1 | 9/2002 | Dean et al. |
| 2002/0129014 A1 | 9/2002 | Kim et al. |
| 2002/0129015 A1* | 9/2002 | Caudill et al. ............... 707/6 |
| 2002/0165873 A1 | 11/2002 | Kwok et al. |
| 2002/0168106 A1* | 11/2002 | Trajkovic ............... 382/170 |
| 2002/0169595 A1 | 11/2002 | Agichtein et al. |
| 2002/0169754 A1* | 11/2002 | Mao et al. ............... 707/3 |
| 2002/0169770 A1 | 11/2002 | Kim et al. |
| 2002/0169800 A1 | 11/2002 | Sundaresan et al. |
| 2003/0004952 A1 | 1/2003 | Nixon et al. |
| 2003/0028520 A1* | 2/2003 | Alpha ............... 707/2 |
| 2003/0037074 A1 | 2/2003 | Dwork et al. |
| 2003/0046389 A1 | 3/2003 | Thieme |
| 2003/0053084 A1 | 3/2003 | Geidl et al. |
| 2003/0055810 A1 | 3/2003 | Cragun et al. |
| 2003/0061201 A1 | 3/2003 | Grefenstette et al. |
| 2003/0065706 A1 | 4/2003 | Smyth et al. |
| 2003/0074368 A1 | 4/2003 | Schuetze et al. |
| 2003/0088545 A1 | 5/2003 | Subramaniam et al. |
| 2003/0101183 A1 | 5/2003 | Kabra et al. |
| 2003/0135490 A1 | 7/2003 | Barrett et al. |
| 2003/0195882 A1 | 10/2003 | Lee et al. |
| 2003/0208482 A1 | 11/2003 | Kim et al. |
| 2003/0217007 A1 | 11/2003 | Fukushima et al. |
| 2003/0217047 A1 | 11/2003 | Marchisio |
| 2003/0217052 A1 | 11/2003 | Rubenczyk et al. |
| 2004/0003028 A1 | 1/2004 | Emmett et al. |
| 2004/0006559 A1 | 1/2004 | Gange et al. |
| 2004/0024752 A1 | 2/2004 | Manber et al. |
| 2004/0049766 A1 | 3/2004 | Bloch et al. |
| 2004/0064442 A1 | 4/2004 | Popovitch |
| 2004/0093328 A1 | 5/2004 | Damle |
| 2004/0111408 A1* | 6/2004 | Caudill et al. ............... 707/3 |
| 2004/0117351 A1 | 6/2004 | Challapalli et al. |
| 2004/0141354 A1 | 7/2004 | Carnahan |
| 2004/0148278 A1 | 7/2004 | Milo et al. |
| 2004/0181515 A1 | 9/2004 | Ullman et al. |
| 2004/0186827 A1 | 9/2004 | Anick et al. |
| 2004/0194099 A1 | 9/2004 | Lamping et al. |
| 2004/0199497 A1 | 10/2004 | Timmons |
| 2004/0205497 A1 | 10/2004 | Alexander et al. |
| 2004/0215606 A1 | 10/2004 | Cossock |
| 2004/0215664 A1 | 10/2004 | Hennings et al. |
| 2004/0249795 A1 | 12/2004 | Brockway et al. |
| 2004/0254932 A1 | 12/2004 | Gupta et al. |
| 2004/0260695 A1 | 12/2004 | Brill |
| 2004/0267722 A1 | 12/2004 | Larimore et al. |
| 2005/0033742 A1 | 2/2005 | Kamvar et al. |
| 2005/0044071 A1 | 2/2005 | Cho et al. |
| 2005/0055340 A1 | 3/2005 | Dresden |
| 2005/0055347 A9 | 3/2005 | Cho et al. |
| 2005/0060186 A1 | 3/2005 | Blowers et al. |
| 2005/0060304 A1 | 3/2005 | Parikh |
| 2005/0060310 A1 | 3/2005 | Tong et al. |
| 2005/0060311 A1 | 3/2005 | Tong et al. |
| 2005/0071328 A1 | 3/2005 | Lawrence |
| 2005/0071741 A1 | 3/2005 | Acharya et al. |
| 2005/0086192 A1 | 4/2005 | Kodama |
| 2005/0086206 A1 | 4/2005 | Balasubramanian et al. |
| 2005/0086583 A1 | 4/2005 | Obata et al. |
| 2005/0089215 A1 | 4/2005 | Staelin et al. |
| 2005/0114324 A1* | 5/2005 | Mayer ............... 707/3 |
| 2005/0125392 A1 | 6/2005 | Curtis et al. |
| 2005/0144162 A1 | 6/2005 | Liang |
| 2005/0154710 A1 | 7/2005 | Ruhlow et al. |
| 2005/0154746 A1 | 7/2005 | Liu et al. |
| 2005/0165753 A1 | 7/2005 | Chen et al. |
| 2005/0165781 A1 | 7/2005 | Kraft et al. |
| 2005/0187965 A1 | 8/2005 | Abajian |
| 2005/0192936 A1 | 9/2005 | Meek et al. |
| 2005/0192955 A1 | 9/2005 | Farrell |
| 2005/0210006 A1 | 9/2005 | Robertson |
| 2005/0210079 A1 | 9/2005 | Edlund et al. |
| 2005/0210105 A1 | 9/2005 | Hirata et al. |
| 2005/0216533 A1 | 9/2005 | Berkhin |
| 2005/0240580 A1 | 10/2005 | Zamir et al. |
| 2005/0251499 A1 | 11/2005 | Huang |
| 2005/0256865 A1 | 11/2005 | Ma et al. |
| 2005/0262050 A1 | 11/2005 | Fagin et al. |
| 2005/0283473 A1 | 12/2005 | Rousso et al. |
| 2005/0289133 A1 | 12/2005 | Arrouye et al. |
| 2005/0289193 A1 | 12/2005 | Arrouye et al. |
| 2006/0004732 A1 | 1/2006 | Odom |
| 2006/0031183 A1* | 2/2006 | Oral et al. ............... 707/1 |
| 2006/0036598 A1 | 2/2006 | Wu |
| 2006/0041521 A1* | 2/2006 | Oral et al. ............... 707/1 |
| 2006/0047643 A1 | 3/2006 | Chaman |
| 2006/0047649 A1 | 3/2006 | Liang |
| 2006/0059144 A1 | 3/2006 | Canright et al. |
| 2006/0064411 A1 | 3/2006 | Gross et al. |
| 2006/0069982 A1 | 3/2006 | Petriuc |
| 2006/0074871 A1 | 4/2006 | Meyerzon et al. |
| 2006/0074883 A1 | 4/2006 | Teevan et al. |
| 2006/0074903 A1 | 4/2006 | Meyerzon et al. |
| 2006/0095416 A1* | 5/2006 | Barkhin et al. ............... 707/3 |
| 2006/0136411 A1 | 6/2006 | Meyerzon et al. |
| 2006/0149723 A1 | 7/2006 | Finger, II |
| 2006/0161534 A1 | 7/2006 | Carson et al. |
| 2006/0173560 A1 | 8/2006 | Widrow |
| 2006/0173828 A1 | 8/2006 | Rosenberg |
| 2006/0195440 A1 | 8/2006 | Burges et al. |

(56) References Cited

U.S. PATENT DOCUMENTS

| | | |
|---|---|---|
| 2006/0200460 A1 | 9/2006 | Meyerzon et al. |
| 2006/0206460 A1 | 9/2006 | Gadkari et al. |
| 2006/0206476 A1 | 9/2006 | Kapur et al. |
| 2006/0212423 A1 | 9/2006 | Jones et al. |
| 2006/0224554 A1 | 10/2006 | Bailey et al. |
| 2006/0248074 A1* | 11/2006 | Carmel et al. ............. 707/5 |
| 2006/0259481 A1 | 11/2006 | Handley |
| 2006/0282306 A1 | 12/2006 | Thissen-Roe |
| 2006/0282455 A1 | 12/2006 | Lee et al. |
| 2006/0287993 A1 | 12/2006 | Yao et al. |
| 2006/0294100 A1 | 12/2006 | Meyerzon et al. |
| 2007/0038616 A1 | 2/2007 | Guha |
| 2007/0038622 A1 | 2/2007 | Meyerzon et al. |
| 2007/0050338 A1 | 3/2007 | Strohm et al. |
| 2007/0067284 A1 | 3/2007 | Meyerzon et al. |
| 2007/0073748 A1 | 3/2007 | Barney |
| 2007/0085716 A1 | 4/2007 | Bar-Yossef et al. |
| 2007/0094285 A1 | 4/2007 | Agichtein et al. |
| 2007/0106659 A1 | 5/2007 | Lu et al. |
| 2007/0150473 A1 | 6/2007 | Li et al. |
| 2007/0198459 A1 | 8/2007 | Boone et al. |
| 2007/0260597 A1 | 11/2007 | Cramer et al. |
| 2007/0276829 A1 | 11/2007 | Wang et al. |
| 2008/0005068 A1 | 1/2008 | Dumais et al. |
| 2008/0016053 A1 | 1/2008 | Frieden et al. |
| 2008/0140641 A1 | 6/2008 | Wang |
| 2008/0154888 A1* | 6/2008 | Buron et al. ............. 707/5 |
| 2008/0195596 A1 | 8/2008 | Sisk et al. |
| 2009/0006356 A1 | 1/2009 | Liao et al. |
| 2009/0006358 A1 | 1/2009 | Morris et al. |
| 2009/0024606 A1 | 1/2009 | Schilit et al. |
| 2009/0070306 A1 | 3/2009 | Stroe et al. |
| 2009/0106221 A1 | 4/2009 | Meyerzon et al. |
| 2009/0106223 A1 | 4/2009 | Meyerzon et al. |
| 2009/0106235 A1 | 4/2009 | Tankovich et al. |
| 2009/0157607 A1* | 6/2009 | Tiyyagura ............. 707/3 |
| 2009/0164929 A1 | 6/2009 | Chen et al. |
| 2009/0240680 A1 | 9/2009 | Tankovich et al. |
| 2009/0259651 A1 | 10/2009 | Tankovich et al. |
| 2009/0276421 A1 | 11/2009 | Qiu |
| 2009/0307209 A1 | 12/2009 | Carmel et al. ............. 707/5 |
| 2010/0191744 A1 | 7/2010 | Meyerzon et al. |
| 2010/0268707 A1 | 10/2010 | Meyerzon et al. |
| 2011/0106850 A1 | 5/2011 | Li et al. |
| 2011/0137893 A1 | 6/2011 | Shnitko et al. |
| 2011/0235909 A1* | 9/2011 | Chenthamarakshan et al. ............. 382/173 |
| 2013/0198174 A1 | 8/2013 | Poznanski et al. |

FOREIGN PATENT DOCUMENTS

| | | |
|---|---|---|
| EP | 0950961 A2 A3 | 10/1999 |
| EP | 0950961 A3 | 10/1999 |
| EP | 1050830 A2 | 11/2000 |
| EP | 1120717 A2 | 8/2001 |
| EP | 1282060 A2 | 2/2002 |
| EP | 1462950 A1 | 9/2004 |
| EP | 1557770 A1 | 7/2005 |
| EP | 1862916 * | 12/2007 |
| ID | P0027547 | 2/2011 |
| JP | 62-297950 | 12/1987 |
| JP | Hei 4-274533 | 9/1992 |
| JP | Hei 04-281565 | 10/1992 |
| JP | 2009-204442 | 8/1997 |
| JP | 2009-305622 | 11/1997 |
| JP | 10091638 | 4/1998 |
| JP | Hei 10-124524 | 5/1998 |
| JP | 10-240757 | 9/1998 |
| JP | Hei 11-45243 | 2/1999 |
| JP | H11-232300 A | 8/1999 |
| JP | 11328191 | 11/1999 |
| JP | 2000-194713 | 7/2000 |
| JP | 2001-052017 | 2/2001 |
| JP | 2001-117934 | 4/2001 |
| JP | 2001-265774 | 9/2001 |
| JP | 2002-091843 | 3/2002 |
| JP | 2002-132769 | 5/2002 |
| JP | 2002-140365 | 5/2002 |
| JP | 2002-157271 | 5/2002 |
| JP | 2002-202992 | 7/2002 |
| JP | 2002-245089 | 8/2002 |
| JP | 2002-366549 | 12/2002 |
| JP | 2003-67419 | 3/2003 |
| JP | 2003-076715 | 3/2003 |
| JP | 2003-208434 | 7/2003 |
| JP | 2003-248696 | 9/2003 |
| JP | 2004-21589 | 1/2004 |
| JP | 2004-54588 | 2/2004 |
| JP | 2004-164555 | 6/2004 |
| JP | 2004-192657 | 8/2004 |
| JP | 2004-265015 | 9/2004 |
| JP | 2008-146424 | 12/2006 |
| JP | 2007-507798 | 3/2007 |
| JP | 2008-033931 | 2/2008 |
| JP | 2009-252179 | 4/2008 |
| JP | 2009-509275 | 3/2009 |
| JP | 4950444 | 3/2012 |
| KR | 10-2002-0015838 A | 3/2002 |
| KR | 10-2003-0081209 A | 10/2003 |
| KR | 20030080826 | 10/2003 |
| KR | 1020060048716 A | 5/2006 |
| KR | 10-2006-0116042 A | 11/2006 |
| KR | 10-2008-0017685 A | 2/2008 |
| MY | 147720 | 1/2013 |
| RU | 2138076 C1 | 9/1999 |
| RU | 2001128643 | 7/2003 |
| RU | 2236699 | 9/2004 |
| RU | 2273879 C2 | 4/2006 |
| RU | 2319202 C2 | 3/2008 |
| TW | I396984 | 5/2013 |
| WO | WO 02/42862 | 5/2002 |
| WO | WO 2006/121269 | 11/2006 |
| WO | WO 2007/089289 * | 8/2007 |
| WO | WO 2007123416 * | 11/2007 |
| WO | WO 2009/072174 | 6/2009 |
| ZA | 2011/00293 | 4/2012 |

OTHER PUBLICATIONS

Svore, Krysta M. et al., "Improving Web Spam Classification using Rank-time Features," Published Date: May 8, 2007 http://www2007.org/workshops/paper_101.pdf.

Hoeber, Orland et al., "Evaluating the Effectiveness of Term Frequency Histograms for Supporting Interactive Web Search Tasks," Published Date: Feb. 25-27, 2008 http://delivery.acm.org/10.1145/1400000/1394484/p360-hoeber.pdf?key1=1394484&key2=1611170721&coll=GUIDE&d1=GUIDE&CFID=83362159&CFTOKEN=63982632.

Pera, Maria S. et al., "Using Word Similarity to Eradicate Junk Emails," Published Date: Nov. 6-8, 2007 http://delivery.acm.org/10.1145/1330000/1321581/p943-pera.pdf?key1=1321581&key2=8421170721&coll=GUIDE&d1=GUIDE&CFID=83362328&CFTOKEN=17563913.

Becker, Hila et al., "Learning Similarity Metrics for Event Identification in Social Media," Published Date: Feb. 4-6, 2010, http://infolab.stanford.edu/~mor/research/becker-wsdm10.pdf, 10 pp.

Svore, Krysta M. et al., "Improving Web Spam Classification using Rank-time Features," Published Date: May 8, 2007, http://www2007.org/workshops/paper_101.pdf, 8 pp.

Hoeber, Orland et al., "Evaluating the Effectiveness of Term Frequency Histograms for Supporting Interactive Web Search Tasks," Published Date: Feb. 25-27, 2008, http://delivery.acm.org/10.1145/1400000/1394484/p360-hoeber.pdf?key1=1394484&key2=1611170721&coll=GUIDE&d1=GUIDE&CFID=83362159&CFTOKEN=63982632, 9 pp.

Pera, Maria S. et al., "Using Word Similarity to Eradicate Junk Emails," Published Date: Nov. 6-8, 2007 http://delivery.acm.org/10.1145/1330000/1321581/p943-pera.pdf?key1=1321581&key2=8421170721&coll=GUIDE&d1=GUIDE&CFID=83362328&CFTOKEN=17563913, 4 pp.

(56) References Cited

OTHER PUBLICATIONS

PCT International Search Report and Written Opinion in International Application PCT/US2011/033125, mailed Dec. 15, 2011, 8 pgs.
U.S. Appl. No. 12/101,951, Notice of Allowance mailed Dec. 16, 2013, 3 pgs.
U.S. Appl. No. 12/101,951, Petition and Response filed Dec. 16, 2013, 5 pgs.
Russian Notice of Allowance in Application 2011108842, mailed Dec. 16, 2013, 7 pgs. (English translation).
U.S. Appl. No. 11/874,579, Amendment and Response filed Dec. 10, 2013, 17 pgs.
U.S. Appl. No. 12/359,939, Office Action mailed Jan. 2, 2014, 18 pgs.
Canadian Notice of Allowance in Application 2618854, received Jan. 13, 2014, 1 pg.
Chinese Notice of Allowance in Application 2009801129286, mailed Aug. 30, 2013, 4 pgs.
"Microsoft FAST Search Server 2010 for SharePoint, Evaluation Guide", Published on Aug. 12, 2010, Available at: http://www.microsoft.com/downloads/info.aspx?na=41&srcfamilyid=f1e3fb39-6959-4185-8b28-5315300b6e6b&srcdisplaylang=en&u=http%3a%2f%2download.microsoft.com%2fdownload%2fA%2f7%2fF%2fA7F98D88-BC15-4F3C-8B71-D42A5ED79964%, 60 pgs.
"Okapi Similarity Measurement (Okapi)", 11th International Web Conference, www2002, 2002, p. 1.
Agarwal et al., "Ranking Database Queries Using User Feedback: A Neural Network Approach", Fall 2006, 9 pp.
Agichten et al., "Improving Web Search Ranking by Incorporating User Behavior Information"—http://www.mathcs.emory.edu/~eugene/papers/sigir2006ranking.pdf, 8 pp.
Australian Exam Report in Application No. 2008 00521-7, mailed Mar. 11, 2009, 4 pgs.
Australian First Examiner's Report in 2006279520 mailed Oct. 5, 2010.
Australian Notice of Allowance in Application 2006279520, mailed Mar. 2, 2011, 3 pgs.
Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.
Bohm et al., "Multidimensional Index Structures in Relational Databases", Journal of Intelligent Information Systems, Jul. 2000, vol. 15, Issue 1, pp. 1-20, found at: http://springerlink.com/content/n345270t27538741/fulltext.pdf.
Brin, S. et al., "The Anatomy of a Large-Scale Hypertextual Web Search Engine", Proceedings of the Seventh International World-Wide Web Conference, 'Online! Apr. 14, 1998, pp. 1-26.
Burges, Christopher J.C. et al. "Learning to Rank with Non-smooth Cost Functions"—http://books.NIPS.cc/papers/txt/nips19/NIPS2006_0574.txt, 2 pp.
Canadian Office Action in Application 2618854, mailed Mar. 27, 2013, 2 pgs.
Carmel, D. et al., "Searching XML Documents Via XML Fragments", SIGIR Toronto, Canada, Jul.-Aug. 2003, pp. 151-158.
Chakrabarti, S., "Recent Results in Automatic Web Resource Discovery", ACM Computing Surveys, vol. 31, No. 4es, Dec. 1999, pp. 1-7.
Chen, Hsinchun et al., "A Smart Itsy Bitsy Spider for the Web", Journal of the American Society for Information Science, 49(7), 1998, pp. 604-618.
Chen, Michael et al., Cha Cha, "A System for Organizing Intranet Search Results", Computer Science Department, University of California, Berkeley, 1999, pp. 1-12.
Chinese 1st Office Action in Application 200980112928.6, mailed Jun. 8, 2012, 8 pgs.
Chinese 2nd Office Action in Application 200980112928.6, mailed Mar. 4, 2013, 9 pgs.
Chinese Application 200510088213.5, Notice of Allowance mailed Apr. 20, 2010, 4 pgs.
Chinese Application No. 200510088212.0, First Office Action mailed Jul. 4, 2008, 10 pgs.
Chinese Application No. 200510088212.0, Notice of Allowance mailed Jan. 8, 2010, 4 pgs.
Chinese Decision on Reexamination cited in 200680029645.1, mailed Dec. 14, 2012, 15 pgs.
Chinese Decision on Re-Examination in Application 200510084707.6 mailed Aug. 22, 2011, 12 pgs.
Chinese Decision on Rejection in 200680029645.1 mailed Aug. 12, 2010.
Chinese Final Rejection in 200510084707.6 mailed Aug. 21, 2009, 13 pgs.
Chinese Final Rejection in 200510088213.5 mailed Mar. 6, 2009.
Chinese First Office Action in 200510084707.6 mailed Mar. 28, 2008, 10 pgs.
Chinese First Office Action in 200680034531.6 mailed Sep. 11, 2009, 7 pgs.
Chinese First Office Action in Chinese Application/Patent No. 200880112416.5, mailed Aug. 12, 2011, 11 pgs.
Chinese First Official Action in 200510088213.5 mailed May 9, 2008.
Chinese First Official Action in 200510088527.5 mailed Apr. 18, 2008.
Chinese First Official Action in 200680029645.1 mailed Jun. 19, 2009.
Chinese First Official Action in 200680035828.4 mailed Jun. 19, 2009.
Chinese Notice of Allowance in 200510088527.5 mailed Jul. 24, 2009, 4 pgs.
Chinese Notice of Allowance in 200680034531.6 mailed Oct. 14, 2010, 6 pgs.
Chinese Notice of Allowance in Application 200510084707.6, mailed Sep. 25, 2012, 4 pgs.
Chinese Notice of Allowance in Application 200880112416.5, mailed Jul. 18, 2012, 4 pgs.
Chinese Notice of Reexamination in Application 200680029645.1, mailed Aug. 20, 2012, 11 pgs.
Chinese Second Office Action in 200510084707.6 mailed Nov. 7, 2008, 10 pgs.
Chinese Second Office Action in 200680029645.1 mailed Apr. 6, 2010.
Chinese Second Official Action in 200510088213.5 mailed Oct. 10, 2008.
Chinese Second Official Action in 200510088527.5 mailed Dec. 26, 2008.
Chinese Third Office Action in 200510084707.6 mailed Feb. 20, 2009, 12 pgs.
Chinese Third Official Action in 200510088213.5 mailed Sep. 4, 2009.
Cho et al., "Efficient Crawling Through URL Ordering", In Proceedings of the 7th International World Wide Web Conference, Apr. 1998, pp. 161-180.
Conlon, M., "Inserts Made Simple", American Printer, Nov. 1, 2002, retrieved from internet on Dec. 17, 2010: http://americanprinter.com/press/other/printing_inserts_made_simple/, 4 pp. (Cited in Search Report Jan. 21, 2011).
Creswell, N. et al., "TREC12 Web Track as CSIRO", TREC 12, Nov. 2003, 11 pp.
Craswell, Nick et al., "Relevance Weighting for Query Independent Evidence", Aug. 15-19, 2005, ACM, pp. 416-423.
Cutler, M. et al., "A New Study on Using HTML Structures to Improve Retrieval", 11th IEEE International Conference on Chicago, IL, Nov. 9-11, 1999, pp. 406-409.
Desmet, P. et al., "Estimation of Product Category Sales Responsiveness to Allocated Shelf Space", Intern. J. of Research in Marketing, vol. 15, No. 5, Dec. 9, 1998, pp. 443-457. (Cited in Search Report Feb. 23, 2011).
Ding, Chen et al., "An Improved Usage-Based Ranking", obtained online Jul. 1, 2009 at: http://www.springerlink.com/content/h0jut6d1dnrk5227/fulltext.pdf, 8 pgs.
Egyptian Official Action in PCT 269/2008 mailed Feb. 1, 2010.

(56) References Cited

OTHER PUBLICATIONS

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
EP 2nd Office Action in Application 05105672.9, mailed Oct. 15, 2009, 4 pgs.
EP Communication to cancel the oral summons in Application 05105048.2, mailed Jul. 16, 2012, 1 pg.
EP Exam Report in EP 00309121.2-1522 mailed Jul. 4, 2003.
EP Exam Report in EP 00309121.2-1527 mailed Feb. 8, 2007.
EP Exam Report in EP 00309121.2-1527 mailed Jun. 16, 2004.
EP Exam Report in EP 05105048.2-2201 mailed Apr. 23, 2007.
EP Examination Report in Application 05105672.9, mailed Oct. 24, 2006, 4 pgs.
EP Notice of Allowance in Application 05105048.2, mailed Aug. 13, 2012, 8 pgs.
EP Office Action in Application 05105107.6, mailed Mar. 28, 2008, 6 pgs.
EP Result of consultation in Application 05105048.2, mailed Aug. 8, 2012, 3 pgs.
EP Search Report in Application 05105107.6, mailed Apr. 7, 2006, 3 pgs.
EP Search Report in Application 05105672.9, mailed Feb. 6, 2006, 3 pgs.
EP Search Report in EP 00309121 mailed Jul. 18, 2002.
EP Search Report in EP 05105048 mailed Jan. 17, 2006.
EP Search Report in EP 05105110 dated Aug. 11, 2006.
EP Summons to Attend Oral Proceedings in EP 05105048.2-2201 mailed Apr. 3, 2012.
European Communication in Application 05105107.6, mailed Dec. 17, 2012, 4 pgs.
European Extended Search Report in Application 06836141.9 mailed Dec. 27, 2011, 8 pgs.
European Extended Search Report in Application 097308084, mailed Oct. 2, 2012, 7 pgs.
European Notice of Allowance in Application 00309121.2, mailed Jun. 15, 2009, 5 pgs.
European Notice of Allowance in Application EP 06836141.9, mailed Jan. 31, 2013, 6 pgs.
European Official Action in 05105110.0-1527 mailed Aug. 4, 2010.
European Report on Result of Consultation in Application EP 06836141.9, mailed Jan. 9, 2013, 3 pgs.
European Search Report in 08840594.9-2201 mailed Feb. 23, 2011.
European Search Report in 08840594.9-2201 mailed Jan. 21, 2011.
European Search Report in Application 06789800.7 mailed Oct. 13, 2011, 11 pgs.
Extended European Search Report in Application 06804098.9, mailed Dec. 19, 2011, 7 pgs.
Fagin, R. et al., "Searching the Workplace Web", IBM Almaden Research Center, In Proceedings of the Twelfth International World Wide Web Conference, Budapest, May 20, 2003, 21 pgs.
Fagin, Ronald, "Searching the Workplace Web", Mar. 3, 2005, pp. 1-10.
Fiedler, J. et al., Using the Web Efficiently: Mobile Crawlers, 17th Annual Int'l. Conference of the Association of Management on Computer Science, Aug. 1999, pp. 324-329.
Gross, Christian, Microsoft Interactive Developer, No. 2, "Integrating the Microsoft Index Server with Active Server Pages", Jun. 1997, 21 pgs.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking, D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Horikawa, Akira, "Table design correcting room of Access user", Visual Basic Magazine, vol. 6, No. 3, pp. 158-170, Shoeisha Col. Ltd., Japan, Mar. 1, 2000. (No English translation). As cited in JP 2005-175174.
Huang et al., "Design and Implementation of a Chinese Full-Text Retrieval System Based on Probabilistic Model", IEEE, 1993, pp. 1090-1093.
Huuhka, "Google: Data Structures and Algorithms".
Indonesian Notice of Allowance in Application W00200800848 mailed Jun. 9, 2011, 4 pgs.
Japanese Appeal Decision and Notice of Allowance in Application 2005-175174, mailed Jun. 18, 2013, 4 pgs.
Japanese Appeal Decision in 2008-527094 (Appeal No. 2010-011037) mailed Nov. 4, 2011—31 pgs., only first page translated.
Japanese Final Notice of Rejection in Application No. 2005-187816 mailed Mar. 16, 2012, 5 pgs.
Japanese Final Rejection in 2005-175172 mailed Jun. 7, 2011, 5 pgs.
Japanese Final Rejection in 2008-527094 mailed Jan. 22, 2010.
Japanese Final Rejection in JP Application 2008-532469, mailed Jan. 29, 2010, 19 pgs.
Japanese Interrogation in Application 2005-175174, mailed Jul. 24, 2012, 7 pgs.
Japanese Notice of Allowance in 2005-175172 mailed Mar. 6, 2012, 6 pgs.
Japanese Notice of Allowance in 2005-175173 mailed Jun. 7, 2011, 6 pgs.
Japanese Notice of Allowance in Application 2011-021985, mailed Dec. 25, 2012, 6 pgs.
Japanese Notice of Allowance in Application 2011-194741, mailed Sep. 6, 2013, 4 pgs.
Japanese Notice of Allowance in JP Application 2008-532469, mailed Feb. 22, 2011, 6 pgs.
Japanese Notice of Final Rejection in 2005-175174 (0292JP01), mailed Aug. 5, 2011, 5 pgs.
Japanese Notice of Rejection in 2005-175172 mailed Sep. 28, 2010.
Japanese Notice of Rejection in 2005-175173 mailed Oct. 1, 2010.
Japanese Notice of Rejection in 2005-175174 (0292JP01), mailed Oct. 29, 2010, 13 pgs.
Japanese Notice of Rejection in 2008-527094 mailed Sep. 11, 2009.
Japanese Notice of Rejection in Application 2011-194741, mailed May 14, 2013, 4 pgs.
Japanese Notice of Rejection in Application 2011-266249, mailed Sep. 2, 2013, 7 pgs.
Japanese Notice of Rejection in Application 2011-504031, mailed May 14, 2013, 4 pgs.
Japanese Notice of Rejection in Application 2011-527079, mailed Oct. 8, 2013, 15 pgs.
Japanese Notice of Rejection in Application No. 2005-187816 mailed May 20, 2011, 13 pgs.
Japanese Office Action in JP Application 2008-532469, mailed Sep. 29, 2009, 18 pgs.
Jones, K. et al., "A probabilistic model of information retrieval: development and status", Department of Information Science, City University, London, Aug. 1998, 76 pgs.
Kazama, K., "A Searching and Ranking Scheme Using Hyperlinks and Anchor Texts", IPSJ SIG Technical Report, vol. 2000, No. 71, Information Processing Society of Japan, Japan, Jul. 28, 2000, pp. 17-24. (cited in Oct. 1, 2010 OA).
Kleinberg, Jon M., "Authoritative Sources in a Hyperlinked Environment", Proceedings of the aCM-SIAM symposium on Discrete Algorithms, 1998, 34 pgs.
Korean Notice of Preliminary Rejection in Application 10-2008-7003121, mailed Jan. 21, 2013, 11 pgs.
Korean Notice of Preliminary Rejection in Application 1020087006775, mailed Feb. 4, 2013, 1 pg.
Korean Notice of Preliminary Rejection in Application 10-2008-7007702, mailed Feb. 4, 2013, 4 pgs.
Korean Official Action in 2005-0057199 mailed Aug. 4, 2011, pgs.
Korean Official Action in 2005-0057199 mailed Mar. 26, 2012, 5 pgs.

(56) References Cited

OTHER PUBLICATIONS

Kotsakis, E., "Structured Information Retrieval in XML Documents", Proceedings of the ACM Symposium on Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.

Kwok, K.L., "A Network Approach to Probabilistic Information Retrieval", ACM Transactions on Information Systems, vol. 13, No. 3, Jul. 1995, pp. 324-353.

Lalmas, M., "Uniform Representation of Content and Structure for Structured Document Retrieval", 20th SGES International Conference on Knowledge Based Systems and Applied Artificial Intelligence, Cambridge, UK, Dec. 2000, pp. 1-12.

Lam et al, "Automatic document classification based on probabilistic reasoning: model and performance analysis," Oct. 12-15, 1997, IEEE, Computational Cybernetics and Simulation vol. 3, pp. 2719-2723.

Larkey, Leah S., et al., "Collection Selection and Results Merging with Topically Organized US Patents and TREC Data", Proceedings of the Ninth International Conference on Information Knowledge Management, CIKM 2000, Nov. 6-11, 2000, pp. 282-289.

Lee, J.K.W. et al., "Intelligent Agents for Matching Information Providers and Consumers on the Worl-Wide Web", IEEE, 1997, pp. 189-199.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Losee, R. et al., "Research in Information Organization", Literature Review, School of Information and Library Science, Section 4, pp. 53-96, Jan. 2001.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Luxenburger et al., "Matching Task Profiles and User Needs in Personalized Web Search", CIKM Proceeding of the 17th ACM Conference on Information and Knowledge Mining, Oct. 2008, pp. 689-698.

Malaysia Adverse Report in Application PI20063920, mailed Jul. 31, 2012, 3 pgs.

Malaysia Adverse Search Report in Application PI20080638, mailed Jul. 31, 2012, 4 pgs.

Malaysian Notice of Allowance in Application PI 20080638, mailed Jun. 28, 2013, 2 pgs.

Malaysian Notice of Allowance in Application PI20063920, mailed Dec. 14, 2012, 2 pgs.

Malaysian Substantive Examination Report in Application PI 20063920, mailed Jul. 31, 2012, 3 pgs.

Managing External Content in Microsoft Office SharePoint Portal Server 2003, http://www.microsoft.com/technet/prodtechnol/sppt/reskit/c2261881x.mspx, published on Jun. 9, 2004, printed on May 22, 2006, 20 pp.

Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.

Matsuo, Y., "A New Definition of Subjective Distance Between Web Pages," IPSJ Journal, vol. 44, No. 1, Information Processing Society of Japan, Japan, Jan. 15, 2003, pp. 88-94. (Cited in Sep. 28, 2010 OA).

Matveeva, Irina et al., "High Accuracy Retrieval with Multiple Nested Ranker," http://people.cs.uchicago.edu/~matveeva/RankerSIGIR06.pdf, *SIGIR*'06, Seattle, WA Aug. 6-11, 2006, 8 pages.

Mexican Office Action with Summary in PA/a/2008/02173 mailed Jun. 5, 2012, 7 pgs.

Microsoft Full-Text Search Technologies, http://www.microsoft.com/technet/prodtechnol/sppt/sharepoint/evaluate/featfunc/mssearc..., published on Jun. 1, 2001, printed on May 22, 2006, 13 pp.

Microsoft SharePoint Portal Server 2001 Resource Kit: Chapter 24, Analyzing the Default Query for the Dashboard, http://www.microsoft.com/technet/prodtechnol/sppt/sharepoint/reskit/part5/c24spprk.mspx, printed on May 22, 2006, 5 pp.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

Mittal et al., "Framework for Synthesizing Semantic-Level Indices", Multimedia Tools and Applications, Jun. 2003, vol. 20, Iss. 2., pp. 1-24, found online at: http://www.springerlink.com/content/tv632274r1267305/fulltext.pdf.

MSDN, "Understanding Ranking," http://msdn.microsoft.com/en-us/library/ms142524.aspx, Sep. 2007, 4 pages.

Murata, Shin Ya, et al., "Ranking Search Results based on Information Needs in Conjunction with Click-Log Analysis", Journal of Japan Database Society, Japan Database Society, Mar. 27, 2009, vol. 7, Part 4, pp. 37-42.

Najork, Marc et al., "Breadth-First Crawling Yields High-Quality Pages", ACM, Compaq Systems Research Center, Hong Kong, 2001, pp. 114-118.

Nelson, Chris, "Use of Metadata Registries for Searching for Statistical Data", IEEE 2002, Dimension EDI Ltd., pp. 232-235, 2002.

New Zealand Examination Report in Application No. 566532, mailed Oct. 15, 2009, 2 pgs.

Nie, Jien Yun, "Introduction to Information Retrieval", University of Montreal Canada, 1989 pp. 1-11.

Numerico, T., "Search engines organization of information and Web Topology", http://www.cafm.lsbu.ac.uk/eminars/sse/numerico-6-dec-2004.pdf, Dec. 6, 2004, 32 pgs.

Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.

Page, L. et al., "The PageRank Citation Ranking: Bringing Order To The Web", Internet Citation, found online at: http://citeseer.nj.nec.com/page98pagerank.html, retrieved Sep. 16, 2002, 18 pgs.

PCT International Search Report in PCT/US2009/036597 dated Aug. 28, 2009, 11 pgs.

PCT International Search Report, Application No. PCT/US2006/037206, mailed Jan. 16, 2007, 10 pgs.

PCT Search Report in Application PCT/US2013/022825, mailed Apr. 30, 2013, 11 pgs.

PCT Search Report in PCT/US2006/031965 mailed Jan. 11, 2007.

PCT Search Report in PCT/US2008/011894 mailed Feb. 27, 2009, 12 pgs.

PCT Search Report in PCT/US2009/063333 dated Apr. 22, 2010, 10 pgs.

Philippines Office Action in 1-2008-500189 mailed Mar. 11, 2011, 1 page.

Philippines Official Action in 1-2008-500189 mailed Jun. 22, 2011, 1 page.

Philippines Official Action in 1-2008-500433 mailed Mar. 24, 2011, 1 page

Philippines Letters Patent in Application 12008500189, issued Jan. 6, 2012, 2 pgs.

Planning Your Information Structure Using Microsoft Office SharePoint Portal Server 2003, http://www.microsoft.com/technet/prodtechnol/sppt/reskit/c0861881x.mspx, published on Jun. 9, 2004, printed on May 22, 2006, 22 pp.

Radlinski, Filip, et al.,, Query Chains: Learning to Rank from Implicit Feedback, http://delivery.acm.org/10.1145/1090000/1081899/p239-radlinski.pdf?key1=1081899&key2=3628533811&coll=GUIDE&CFID=27212902&CFTOKEN=53118399, *KDD*'05, Chicago, IL, Aug. 21-24, 2005, 10 pages.

Robertson, S. et al., "Okapi at TREC-3", Centre for Interactive Systems Research Department of Information Science, Third Text Retrieval Conference, 1995, 19 pp. (cited in US Official Action, Dec. 21, 2011).

Robertson, S. et al., "Okapi at TREC-4", 1996, 24 pp.

Robertson, S. et al., "Some Simple Effective Approximations to the 2-Poisson Model for Probabilistic Weighted Retrieval", Proceedings

(56) References Cited

OTHER PUBLICATIONS of the 17th Annual International ACM SIGIR Conference on Research and Development in Information Retrieval, 1994, pp. 232-241.
Russian Application No. 2008105758, Notice of Allowance mailed Dec. 16, 2010, 5 pgs.
Russian Notice of Allowance in Application No. 2008110731/08, mailed Oct. 25, 2010, 7 pgs.
Russian Notice of Allowance in Application No. 2010141559, mailed Jun. 27, 2013, 6 pgs.
Russian Office Action in Application 2010141559, mailed Jan. 28, 2013, 6 pgs.
Russian Official Action in 2008105758 mailed Jun. 29, 2010.
Russian Official Action in 2010141559, mailed Jan. 28, 2013, 4 pgs. (in foreign language).
Schulz, Stefan, et al., "Indexing Medical WWW Documents by Morphemes", MEDINFO 2001 Proceedings of the 10th World Congress on Medical Informatics, Park I, IOS Press, Inc., pp. 266-270, 2001.
Senecal, Sylvain, "Consumers' Decision-Making Process and Their Online Shopping Behavior: A Clickstream Analysis", Jun. 1, 2004, pp. 1600-1607.
Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.
SharePoint Portal Server 2001 Planning and Installation Guide, http://www.microsoft.com/technet/prodtechnol/sppt/sharepoint/plan/planinst.mspx, printed on May 22, 2006, 86 pp.
Singhal, A. et al., "AT&T at TREC-9", Proceedings of the Ninth Text Retrieval Conference, NIST Special Publication 500-249, 'Online! 2001, pp. 103-105.
Singhal, A. et al., "Document Length Normalization", Cornell University, vol. 32, No. 5, 1996, pp. 619-633.
Smyth, Barry, "Relevance at a Distance—An Investigation of Distance-Biased Personalization on the Mobile Internet", no date, pp. 1-6.
Song et al., "Exploring URL Hit Priors for Web Search", vol. 3936, Springer Berlin / Heidelberg, 2006.
South Africa Notice of Allowance in Application No. 2008/02250 mailed Jul. 23, 2009, 1 page.
Sturdy, Derek, "Squirrels and nuts: metadata and knowledge management", Business Information Review, 18(4), pp. 34-42, Dec. 2001.
Taiwanese Notice of Allowance in Application 95129817, mailed Jan. 29, 2013, 4 pgs.
Taiwanese Search Report in Application 95129817, mailed Oct. 19, 2012, 1 pg. (OA is in foreign language).
Takeda, Takaharu et al., "Multi-Document Summarization by efficient text processing", *Proceedings of the FIT2007, Sixth Forum on Information Technology*, vol. 2, No. E-014, pp. 165-168, Information Processing Society of Japan, Japan, Aug. 22, 2007. (not an English document).
Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, Nov. 5-11, 2006, pp. 585-593.
US Official Action in U.S. Appl. No. 10/609,315 mailed Dec. 15, 2005, 13 pgs.
US Official Action in U.S. Appl. No. 10/609,315 mailed Jun. 1, 2006, 12 pgs.
US Official Action in U.S. Appl. No. 10/804,326 mailed Dec. 10, 2008, 7 pgs.
US Official Action in U.S. Appl. No. 10/804,326 mailed Jun. 7, 2007, 19 pgs.
US Official Action in U.S. Appl. No. 10/804,326 mailed Oct. 16, 2006, 18 pgs.
US Official Action in U.S. Appl. No. 10/955,462 mailed May 11, 2007, 26 pgs.
US Official Action in U.S. Appl. No. 10/955,462 mailed Nov. 3, 2006, 19 pgs.
US Official Action in U.S. Appl. No. 10/955,462 mailed Sep. 10, 2007, 22 pgs.
US Official Action in U.S. Appl. No. 10/955,983 mailed Dec. 18, 2008, 29 pgs.
US Official Action in U.S. Appl. No.10/955,983 mailed Jul. 21, 2008, 28 pgs.
US Official Action in U.S. Appl. No. 10/955,983 mailed Jun. 10, 2009, 30 pgs.
US Official Action in U.S. Appl. No. 10/955,983 mailed Mar. 22, 2007, 25 pgs.
US Official Action in U.S. Appl. No. 10/955,983 mailed Nov. 13, 2007, 27 pgs.
US Official Action in U.S. Appl. No. 10/981,962 mailed Apr. 30, 2007, 21 pgs.
US Official Action in U.S. Appl. No. 10/981,962 mailed Apr. 5, 2006, 15 pgs.
US Official Action in U.S. Appl. No. 10/981,962 mailed Mar. 17, 2008, 20 pgs.
US Official Action in U.S. Appl. No. 10/981,962 mailed Sep. 21, 2006, 16 pgs.
US Official Action in U.S. Appl. No. 11/019,091 mailed Apr. 3, 2008.
US Official Action in U.S. Appl. No. 11/019,091 mailed Dec. 11, 2008, 24 pgs.
US Official Action in U.S. Appl. No. 11/019,091 mailed Jun. 20, 2007.
US Official Action in U.S. Appl. No. 11/019,091 mailed Sep. 1, 2009, 26 pgs.
US Official Action in U.S. Appl. No. 11/073,381 mailed Apr. 12, 2010, 25 pgs.
US Official Action in U.S. Appl. No. 11/073,381 mailed Apr. 15, 2009, 20 pgs.
US Official Action in U.S. Appl. No. 11/073,381 mailed Feb. 23, 2011, 27 pgs.
US Official Action in U.S. Appl. No. 11/073,381 mailed Jul. 10, 2008, 19 pgs.
US Official Action in U.S. Appl. No. 11/073,381 mailed Sep. 13, 2010, 24 pgs.
US Official Action in U.S. Appl. No. 11/073,381 mailed Sep. 18, 2007, 17 pgs.
US Official Action in U.S. Appl. No. 11/073,381 mailed Sep. 29, 2009, 21 pgs.
US Official Action in U.S. Appl. No. 11/206,286 mailed Dec. 24, 2008, 16 pgs.
US Official Action in U.S. Appl. No. 11/206,286 mailed Jul. 14, 2008, 15 pgs.
US Official Action in U.S. Appl. No. 11/238,906 mailed Dec. 18, 2009, 21 pgs.
US Official Action in U.S. Appl. No. 11/238,906 mailed Jan. 8, 2008, 18 pgs.
US Official Action in U.S. Appl. No. 11/238,906 mailed May 19, 2009, 20 pgs.
US Official Action in U.S. Appl. No. 11/238,906 mailed Sep. 16, 2008, 17 pgs.
US Official Action in U.S. Appl. No. 11/412,723 mailed Mar. 11, 2010, 20 pgs.
US Official Action in U.S. Appl. No. 11/412,723 mailed Mar. 6, 2009, 22 pgs.
US Official Action in U.S. Appl. No. 11/412,723 mailed May 28, 2008, 22 pgs.
US Official Action in U.S. Appl. No. 11/412,723 mailed Sep. 3, 2009, 20 pgs.
US Official Action in U.S. Appl. No. 11/874,579 mailed Jan. 14, 2011, 23 pgs.
US Official Action in U.S. Appl. No. 11/874,579 mailed Jun. 22, 2010, 23 pgs.
US Official Action in U.S. Appl. No. 11/874,844 mailed Nov. 13, 2009, 14 pgs.
US Official Action in U.S. Appl. No. 12/207,910 mailed Jun. 7, 2011, 30 pgs.
US Official Action in U.S. Appl. No. 12/828,508 mailed Aug. 13, 2010, 16 pgs.

(56) References Cited

OTHER PUBLICATIONS

U.S. Appl. No. 09/749,005, Amendment and Response filed Apr. 28, 2003, 12 pgs.
U.S. Appl. No. 09/749,005, Amendment and Response filed Jun. 21, 2004, 14 pgs.
U.S. Appl. No. 09/749,005, Notice of Allowance mailed Mar. 4, 2005, 4 pgs.
U.S. Appl. No. 09/749,005, Notice of Allowance mailed Apr. 7, 2005, 4 pgs.
U.S. Appl. No. 09/749,005, Notice of Allowance mailed Aug. 30, 2004, 9 pgs.
U.S. Appl. No. 09/749,005, Office Action mailed Oct. 28, 2002, 12 pgs.
U.S. Appl. No. 09/749,005, Office Action mailed Jun. 12, 2003, 10 pgs.
U.S. Appl. No. 10/959,330, Amendment and Response filed Jan. 6, 2006, 10 pgs.
U.S. Appl. No. 10/959,330, Amendment and Response filed Sep. 14, 2005, 12 pgs.
U.S. Appl. No. 10/959,330, Notice of Allowance mailed Apr. 3, 2006, 6 pgs.
U.S. Appl. No. 10/959,330, Office Action mailed Dec. 14, 2005, 6 pgs.
U.S. Appl. No. 10/959,330, Office Action mailed Jun. 27, 2005, 10 pgs.
U.S. Appl. No. 10/968,716, Amendment and Response filed Jan. 25, 2008, 8 pgs.
U.S. Appl. No. 10/968,716, Amendment and Response filed Jun. 15, 2007, 13 pgs.
U.S. Appl. No. 10/968,716, Amendment and Response filed Aug. 13, 2007, 6 pgs.
U.S. Appl. No. 10/968,716, Notice of Allowance mailed Jun. 2, 2008, 8 pgs.
U.S. Appl. No. 10/968,716, Office Action mailed Oct. 26, 2007, 14 pgs.
U.S. Appl. No. 10/968,716, Office Action mailed Mar. 15, 2007, 13 pgs.
U.S. Appl. No. 11/874,579, Office Action mailed Sep. 10, 2013, 27 pgs.
U.S. Appl. No. 12/101,951, Advisory Action mailed Jun. 27, 2012, 3 pgs.
U.S. Appl. No. 12/101,951, Amendment and Response filed Jan. 9, 2012, 10 pgs.
U.S. Appl. No. 12/101,951, Amendment and Response filed Dec. 3, 2010, 16 pgs.
U.S. Appl. No. 12/101,951, Amendment and Response filed Jun. 21, 2012, 8 pgs.
U.S. Appl. No. 12/101,951, Amendment and Response filed Jun. 3, 2011, 12 pgs.
U.S. Appl. No. 12/101,951, Amendment filed Oct. 30, 2013, 8 pgs.
U.S. Appl. No. 12/101,951, Notice of Allowance mailed Jul. 30, 2013, 5 pgs.
U.S. Appl. No. 12/101,951, Notice of Allowance mailed Sep. 18, 2013, 2 pgs.
U.S. Appl. No. 12/101,951, Notice of Allowance mailed Sep. 5, 2013, 2 pgs.
U.S. Appl. No. 12/101,951, Office Action mailed Oct. 7, 2011, 28 pgs.
U.S. Appl. No. 12/101,951, Office Action mailed Feb. 24, 2012, 28 pgs.
U.S. Appl. No. 12/101,951, Office Action mailed Mar. 4, 2011, 25 pgs.
U.S. Appl. No. 12/101,951, Office Action mailed Aug. 3, 2010, 26 pgs.
U.S. Appl. No. 12/207,910, Amendment and Response filed Mar. 12, 2012, 13 pgs.
U.S. Appl. No. 12/207,910, Amendment and Response filed Sep. 7, 2011, 14 pgs.
U.S. Appl. No. 12/207,910, Office Action mailed Dec. 12, 2011, 27 pgs.
U.S. Appl. No. 12/359,939, Amendment and Response filed Oct. 11, 2013, 11 pgs.
U.S. Appl. No. 12/359,939, Amendment and Response filed Mar. 23, 2012, 11 pgs.
U.S. Appl. No. 12/359,939, Office Action mailed Jun. 17, 2013, 19 pgs.
U.S. Appl. No. 12/359,939, Office Action mailed Jul. 17, 2012, 21 pgs.
U.S. Appl. No. 12/569,028, Amendment and Response filed Jan. 15, 2013, 14 pgs.
U.S. Appl. No. 12/569,028, Amendment and Response filed Dec. 28, 2011, 8 pgs.
U.S. Appl. No. 12/569,028, Amendment and Response filed Jun. 27, 2012, 8 pgs.
U.S. Appl. No. 12/569,028, Amendment and Response filed Aug. 2, 2013, 17 pgs.
U.S. Appl. No. 12/569,028, Office Action mailed Oct. 15, 2012, 14 pgs.
U.S. Appl. No. 12/569,028, Office Action mailed Feb. 27, 2012, 11 pgs.
U.S. Appl. No. 12/569,028, Office Action mailed Apr. 2, 2013, 21 pgs.
U.S. Appl. No. 12/569,028, Office Action mailed Aug. 28, 2013, 21 pgs.
U.S. Appl. No. 12/569,028, Office Action mailed Sep. 28, 2011, 14 pgs.
U.S. Appl. No. 09/493,748, Advisory Action mailed Jan. 4, 2005, 2 pgs.
U.S. Appl. No. 09/493,748, Amendment and Response filed Oct. 12, 2004, 18 pgs.
U.S. Appl. No. 09/493,748, Amendment and Response filed Apr. 20, 2004, 16 pgs.
U.S. Appl. No. 09/493,748, Final Office Action mailed Jul. 20, 2004, 14 pgs.
U.S. Appl. No. 09/493,748, Office Action mailed Sep. 25, 2003, 11 pgs.
U.S. Appl. No. 09/603,695, Advisory Action mailed Aug. 27, 2004, 3 pgs.
U.S. Appl. No. 09/603,695, Amendment and Response filed Nov. 5, 2004, 9 pgs.
U.S. Appl. No. 09/603,695, Amendment and Response filed Feb. 27, 2004, 13 pgs.
U.S. Appl. No. 09/603,695, Amendment and Response filed Jul. 22, 2004, 13 pgs.
U.S. Appl. No. 09/603,695, Final Office Action mailed May 18, 2004, 12 pgs.
U.S. Appl. No. 09/603,695, Notice of Allowance mailed Dec. 21, 2004, 8 pgs.
U.S. Appl. No. 09/603,695, Office Action mailed Nov. 7, 2003, 11 pgs.
U.S. Appl. No. 10/609,315, Amendment and Response filed Nov. 29, 2006, 23 pgs.
U.S. Appl. No. 10/609,315, Amendment and Response filed Mar. 17, 2006, 14 pgs.
U.S. Appl. No. 10/609,315, Notice of Allowance mailed Jan. 24, 2007, 6 pgs.
U.S. Appl. No. 10/609,315, Notice of Allowance mailed May 30, 2007, 4 pgs.
U.S. Appl. No. 10/804,326, Advisory Action mailed Feb. 21, 2008, 3 pgs.
U.S. Appl. No. 10/804,326, Amendment and Response filed Feb. 11, 2008, 28 pgs.
U.S. Appl. No. 10/804,326, Amendment and Response filed Mar. 16, 2007, 21 pgs.
U.S. Appl. No. 10/804,326, Amendment and Response filed Mar. 9, 2009, 8 pgs.
U.S. Appl. No. 10/804,326, Amendment and Response filed Jun. 10, 2008, 27 pgs.
U.S. Appl. No. 10/804,326, Amendment and Response filed Sep. 7, 2007, 26 pgs.
U.S. Appl. No. 10/804,326, Final Office Action mailed Dec. 11, 2007, 24 pgs.

(56) References Cited

OTHER PUBLICATIONS

U.S. Appl. No. 10/804,326, Notice of Allowance mailed May 29, 2009, 8 pgs.
U.S. Appl. No. 10/951,123, Advisory Action mailed Dec. 31, 2007, 3 pgs.
U.S. Appl. No. 10/951,123, Amendment and Response filed Jan. 14, 2008, 10 pgs.
U.S. Appl. No. 10/951,123, Amendment and Response filed Dec. 13, 2007, 10 pgs.
U.S. Appl. No. 10/951,123, Amendment and Response filed Apr. 25, 2007, 15 pgs.
U.S. Appl. No. 10/951,123, Amendment and Response filed Apr. 6, 2009, 18 pgs.
U.S. Appl. No. 10/951,123, Amendment and Response filed Sep. 17, 2008, 15 pgs.
U.S. Appl. No. 10/951,123, Final Office Action mailed Jan. 5, 2009, 23 pgs.
U.S. Appl. No. 10/951,123, Final Office Action mailed Jul. 13, 2007, 15 pgs.
U.S. Appl. No. 10/951,123, Notice of Allowance mailed Jun. 25, 2009, 5 pgs.
U.S. Appl. No. 10/951,123, Office Action mailed Jan. 25, 2007, 16 pgs.
U.S. Appl. No. 10/951,123, Office Action mailed Mar. 18, 2008, 20 pgs.
U.S. Appl. No. 10/955,462 Amendment and Response filed Mar. 10, 2008, 17 pgs.
U.S. Appl. No. 10/955,462 Amendment and Response filed Mar. 5, 2007, 18 pgs.
U.S. Appl. No. 10/955,462 Amendment and Response filed Aug. 8, 2007, 21 pgs.
U.S. Appl. No. 10/955,462 Notice of Allowance mailed Jan. 25, 2010, 6 pgs.
U.S. Appl. No. 10/955,462 Notice of Allowance mailed Oct. 16, 2009, 7 pgs.
U.S. Appl. No. 10/955,462 Notice of Allowance mailed Feb. 24, 2009, 7 pgs.
U.S. Appl. No. 10/955,462 Notice of Allowance mailed Jun. 10, 2009, 6 pgs.
U.S. Appl. No. 10/955,462 Notice of Allowance mailed Jun. 17, 2008, 12 pgs.
U.S. Appl. No. 10/955,462 Notice of Allowance mailed Sep. 23, 2008, 6 pgs.
U.S. Appl. No. 10/955,983, Amendment and Response filed Oct. 13, 2009, 12 pgs.
U.S. Appl. No. 10/955,983, Amendment and Response filed Mar. 18, 2009, 18 pgs.
U.S. Appl. No. 10/955,983, Amendment and Response filed May 13, 2008, 14 pgs.
U.S. Appl. No. 10/955,983, Amendment and Response filed Aug. 22, 2007, 13 pgs.
U.S. Appl. No. 10/955,983, Amendment and Response filed Sep. 25, 2008, 13 pgs.
U.S. Appl. No. 10/955,983, Notice of Allowance mailed Jan. 12, 2010, 10 pgs.
U.S. Appl. No. 10/955,983, Notice of Allowance mailed Jun. 4, 2010, 5 pgs.
U.S. Appl. No. 10/956,891, Advisory Action mailed Mar. 21, 2008, 3 pgs.
U.S. Appl. No. 10/956,891, Amendment and Response filed Oct. 16, 2008, 12 pgs.
U.S. Appl. No. 10/956,891, Amendment and Response filed Mar. 3, 2008, 11 pgs.
U.S. Appl. No. 10/956,891, Amendment and Response filed May 1, 2008, 11 pgs.
U.S. Appl. No. 10/956,891, Amendment and Response filed Jun. 1, 2009, 12 pgs.
U.S. Appl. No. 10/956,891, Amendment and Response filed Aug. 22, 2007, 11 pgs.
U.S. Appl. No. 10/956,891, Final Office Action filed Nov. 1, 2007, 18 pgs.
U.S. Appl. No. 10/956,891, Final Office Action mailed Dec. 31, 2008, 16 pgs.
U.S. Appl. No. 10/956,891, Notice of Allowance mailed Aug. 20, 2009, 6 pgs.
U.S. Appl. No. 10/956,891, Office Action mailed Mar. 22, 2007, 15 pgs.
U.S. Appl. No. 10/956,891, Office Action mailed Jul. 16, 2008, 19 pgs.
U.S. Appl. No. 10/981,962, Advisory Action mailed Jan. 23, 2007, 3 pgs.
U.S. Appl. No. 10/981,962, Amendment and Response filed Nov. 27, 2007, 10 pgs.
U.S. Appl. No. 10/981,962, Amendment and Response filed Feb. 7, 2007, 1 pg.
U.S. Appl. No. 10/981,962, Amendment and Response filed Jun. 27, 2006, 23 pgs.
U.S. Appl. No. 10/981,962, Amendment and Response filed Jul. 27, 2007, 16 pgs.
U.S. Appl. No. 10/981,962, Amendment and Response filed Aug. 18, 2008, 10 pgs.
U.S. Appl. No. 10/981,962, Notice of Allowance mailed Jan. 29, 2009, 6 pgs.
U.S. Appl. No. 10/981,962, Notice of Allowance mailed Jan. 9, 2009, 6 pgs.
U.S. Appl. No. 10/981,962, Notice of Allowance mailed Oct. 15, 2008, 6 pgs.
U.S. Appl. No. 10/981,962, Notice of Allowance mailed May 8, 2009, 6 pgs.
U.S. Appl. No. 10/981,962, Notice of Allowance mailed Aug. 20, 2009, 6 pgs.
U.S. Appl. No. 10/981,962, Notice of Allowance mailed Sep. 11, 2008, 14 pgs.
U.S. Appl. No. 10/981,962, Office Action mailed Nov. 13, 2007, 3 pgs.
U.S. Appl. No. 11/019,091, Amendment and Response filed Oct. 3, 2008, 15 pgs.
U.S. Appl. No. 11/019,091, Amendment and Response filed Nov. 30, 2009, 11 pgs.
U.S. Appl. No. 11/019,091, Amendment and Response filed Dec. 20, 2007, 23 pgs.
U.S. Appl. No. 11/019,091, Amendment and Response filed Jun. 11, 2009, 12 pgs.
U.S. Appl. No. 11/019,091, Notice of Allowance mailed Dec. 23, 2009, 16 pgs.
U.S. Appl. No. 11/022,054, Amendment and Response filed Aug. 24, 2007, 19 pgs.
U.S. Appl. No. 11/022,054, Notice of Allowance mailed Nov. 15, 2007, 10 pgs.
U.S. Appl. No. 11/022,054, Office Action mailed Jun. 19, 2007, 19 pgs.
U.S. Appl. No. 11/073,381, Amendment and Response filed Dec. 13, 2010, 10 pgs.
U.S. Appl. No. 11/073,381, Amendment and Response filed Dec. 28, 2009, 9 pgs.
U.S. Appl. No. 11/073,381, Amendment and Response filed Dec. 9, 2008, 11 pgs.
U.S. Appl. No. 11/073,381, Amendment and Response filed Mar. 18, 2008, 14 pgs.
U.S. Appl. No. 11/073,381, Amendment and Response filed Jul. 15, 2009, 10 pgs.
U.S. Appl. No. 11/073,381, Amendment and Response filed Jul. 9, 2010, 10 pgs.
U.S. Appl. No. 11/206,286, Amendment and Response filed Mar. 24, 2009, 13 pgs.
U.S. Appl. No. 11/206,286, Amendment and Response filed Jul. 22, 2009, 3 pgs.
U.S. Appl. No. 11/206,286, Amendment and Response filed Sep. 30, 2008, 11 pgs.
U.S. Appl. No. 11/206,286, Notice of Allowance mailed Apr. 22, 2009, 9 pgs.

(56) References Cited

OTHER PUBLICATIONS

U.S. Appl. No. 11/231,955, filed Sep. 21, 2005, Amendment and Response filed Apr. 30, 2008, 12 pgs.
U.S. Appl. No. 11/231,955, filed Sep. 21, 2005, Amendment and Response filed Sep. 15, 2008, 16 pgs.
U.S. Appl. No. 11/231,955, filed Sep. 21, 2005, Final Office Action mailed Jun. 4, 2008, 8 pgs.
U.S. Appl. No. 11/231,955, filed Sep. 21, 2005, Notice of Allowance mailed Oct. 21, 2008, 5 pgs.
U.S. Appl. No. 11/231,955, filed Sep. 21, 2005, Office Action mailed Jan. 30, 2008, 8 pgs.
U.S. Appl. No. 11/238,906, Amendment and Response filed Feb. 26, 2009, 9 pgs.
U.S. Appl. No. 11/238,906, Amendment and Response filed May 28, 2010, 9 pgs.
U.S. Appl. No. 11/238,906, Amendment and Response filed Jun. 9, 2008, 10 pgs.
U.S. Appl. No. 11/238,906, Amendment and Response filed Sep. 1, 2009, 9 pgs.
U.S. Appl. No. 11/238,906, Notice of Allowance mailed Jul. 22, 2010, 10 pgs.
U.S. Appl. No. 11/238,906, Notice of Allowance mailed Aug. 5, 2010, 4 pgs.
U.S. Appl. No. 11/412,723, Amendment and Response filed Nov. 26, 2008, 10 pgs.
U.S. Appl. No. 11/412,723, Amendment and Response filed Nov. 30, 2009, 10 pgs.
U.S. Appl. No. 11/412,723, Amendment and Response filed May 31, 2010, 11 pgs.
U.S. Appl. No. 11/412,723, Amendment and Response filed Jun. 23, 2009, 11 pgs.
U.S. Appl. No. 11/412,723, Notice of Allowance mailed Jul. 9, 2010, 10 pgs.
U.S. Appl. No. 11/874,579, filed Oct. 18, 2007, Amendment and Response filed Nov. 22, 2010, 8 pgs.
U.S. Appl. No. 11/874,579, filed Oct. 18, 2007, Amendment and Response filed May 16, 2011, 14 pgs.
U.S. Appl. No. 11/874,844, Amendment and Response filed Mar. 15, 2010, 16 pgs.
U.S. Appl. No. 11/874,844, Notice of Allowance mailed May 18, 2010, 9 pgs.
U.S. Appl. No. 11/874,844, Notice of Allowance mailed Jun. 25, 2010, 2 pgs.
U.S. Appl. No. 12/359,939, filed Jan. 26, 2009, Amendment and Response filed Oct. 26, 2012, 11 pgs.
U.S. Appl. No. 12/359,939, filed Jan. 26, 2009, Amendment and Response filed Nov. 29, 2012, 9 pgs.
U.S. Appl. No. 12/359,939, filed Jan. 26, 2009, Amendment and Response filed May 23, 2011, 8 pgs.
U.S. Appl. No. 12/359,939, filed Jan. 26, 2009, Amendment and Response filed Jul. 21, 2011, 8 pgs.
U.S. Appl. No. 12/359,939, filed Jan. 26, 2009, Amendment and Response filed Sep. 28, 2011, 14 pgs.
U.S. Appl. No. 12/359,939, filed Jan. 26, 2009, Office Action mailed Jan. 21, 2011, 15 pgs.
U.S. Appl. No. 12/359,939, filed Jan. 26, 2009, Office Action mailed Dec. 6, 2011, 14 pgs.
U.S. Appl. No. 12/828,508, Amendment and Response filed Jan. 13, 2011, 11 pgs.
U.S. Appl. No. 12/828,508, Amendment and Response filed Sep. 6, 2011, 3 pgs.
U.S. Appl. No. 12/828,508, Notice of Allowance mailed Mar. 31, 2011, 9 pgs.
U.S. Appl. No. 12/828,508, Notice of Allowance mailed Jul. 6, 2011, 8 pgs.
Utiyama, Masao et al., "Implementation of an IR package", *IPSJ SIG Notes*, vol. 2001, No. 74 (2001-FI-63-8), pp. 57-64, Information Processing Society of Japan, Japan, Jul. 25, 2001. (not an English document).
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Wen, JI-Rong, "Query Clustering Using User Logs", Jan. 2002, pp. 59-81.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Xue, Gui-Rong et al., "Optimizing Web Search Using Web Click-Through Data," http://people.cs.vt.edu/~xwensi/Publication/p118-xue.pdf, CIKM'04, Nov. 8-13, 2004, 9 pp.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D. Suciu and G. Vossen (eds.): WebDB 2000, LNCS 1997, pp. 38-57, 2001.
Yuwono, Budi and Lee, Dik L., "Search and Ranking Algorithms for Locating Resources on the World Wide Web", IEEE, 1996, pp. 164-170.
Zamir, O. et al., "Grouper: A Dynamic Clustering Interface to Web Search Results", Computer Networks (Amsterdam, Netherlands: 1999), 31(11-16): 1361-1374, 1999.
U.S. Appl. No. 12/101,951, Notice of Allowance mailed Mar. 26, 2014, 8 pgs.
U.S. Appl. No. 12/359,939, Amendment and Response filed Mar. 11, 2014, 10 pgs.
U.S. Appl. No. 12/569,028, Notice of Allowance mailed Feb. 21, 2014, 8 pgs.
U.S. Appl. No. 13/360,536, Office Action mailed Mar. 20, 2014, 14 pgs.
U.S. Appl. No. 11/874,579, Office Action mailed Mar. 28, 2014, 30 pgs.
Australian Office Action in Application 2009234120, mailed Feb. 26, 2014, 3 pgs.
Japanese Notice of Allowance in Application 2011-504031, mailed Jan. 30, 2014, 4 pgs.
U.S. Appl. No. 12/569,028, Amendment and Response filed Jan. 28, 2014, 13 pgs.

\* cited by examiner

DETECTION OF JUNK IN SEARCH RESULT RANKING

CROSS-REFERENCE TO RELATED APPLICATIONS

This application is related to co-pending U.S. patent application Ser. No. 11/874,579, filed Oct. 18, 2007, entitled "Ranking and Providing Search Results Based in Part on a Number of Click Through Parameters," and U.S. patent application Ser. No. 11/874,844, "now U.S. Pat. No. 7,840,569," filed Oct. 18, 2007, entitled "Enterprise Relevancy Ranking Using a Neural Network," both of which applications are incorporated by reference herein in their entirety.

BACKGROUND

Computers users have different ways to locate information that may be locally or remotely stored. For example, search engines may be used to locate documents using a search query. A search engine attempts to return relevant results based on the particular search query.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to rank search results using a junk profile. In embodiments, ranking features, such as junk scores, may be calculated and used by a ranking algorithm to rank candidate documents in response to a search query. In an embodiment, an index is created to facilitate the identification of candidate documents in response to a search query. The index, in embodiments, is optimized by eliminating or separately indexing document data that may have been automatically inserted when the document was created. In embodiments, junk scores for documents may be further calculated by determining the similarity between a document and known junk documents. In embodiments, the junk scores are based on a comparison of histograms for the document to histograms for known junk documents. Histograms may be based upon different junk variables, such as term frequency and chunk size. In embodiments, search results may be identified as possible junk documents based on a calculated junk score, whether or not the search results are ranked based on the junk score. Such identification as possible junk may be displayed to the user and may be maintained as a searchable parameter.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
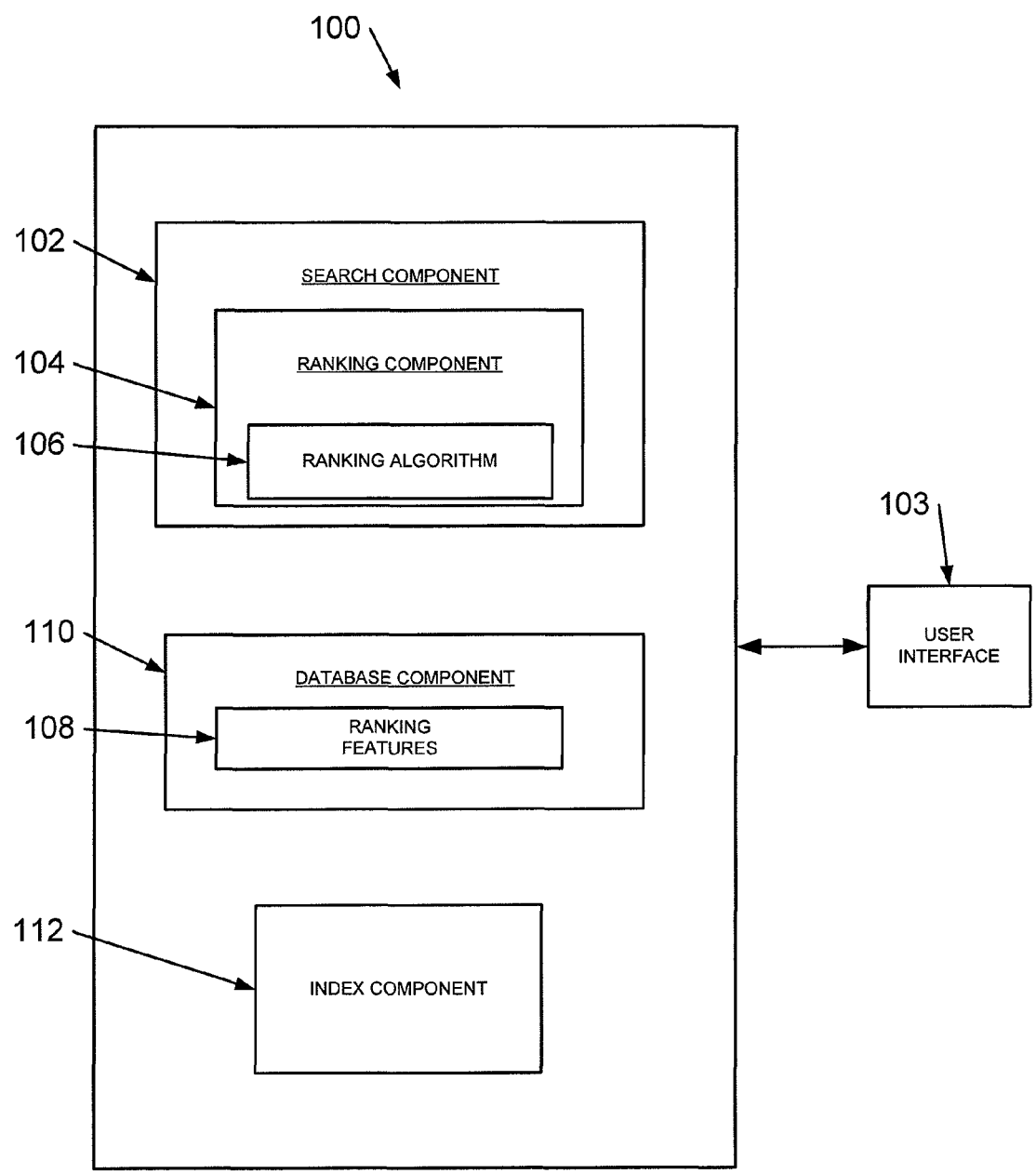
FIG. 1 illustrates an embodiment of a system for ranking search results in accordance with the present disclosure.

Junk documents that are returned in response to a search query can frustrate users and waste valuable time and energy. In embodiments, "junk" documents may include documents that do not contain much human readable document data or that contain little document data other than data that was added automatically by the system or template used to create the document. For example, in enterprise environments, junk documents may be documents that were generated, but no significant content was ever added. Often, such documents may have a title that is a close match to particular search query terms, a popular type of uniform resource locator ("URL") and matching anchor text. Accordingly, a default search-result ranker may have no way to distinguish such junk documents from documents that have useful information and may rank such junk documents highly.

As briefly described above, embodiments disclosed herein are directed to ranking search results using a junk profile. For a given corpus of documents, one or more junk profiles may be created and maintained. In general, the junk profile provides reference metrics or models to represent known junk documents. For example, a junk profile may comprise a dictionary of document data that is automatically inserted into documents created using a particular system or template. A junk profile may also comprise one or more representations (e.g., histograms) of a distribution of a particular junk variable for known junk documents. The junk profile effectively provides a usable representation of known junk documents, and the present systems and methods employ the junk profile to predict the likelihood that documents in the corpus are junk. In embodiments, junk scores are calculated and used to rank such documents higher or lower in response to a search query.

The present systems and methods, although not so limited, may be particularly useful in an enterprise environment in which a corpus of documents is created by one or more known systems and/or templates. In embodiments, a search component of the present disclosure can use the functionality of an integrated server platform, such as MICROSOFT OFFICE SHAREPOINT SERVER® system, to calculate, collect, store, and update junk scores and other ranking features that can be used as part of a ranking determination. Because the MICROSOFT OFFICE SHAREPOINT SERVER® system includes standard and customizable "templates" by which documents may be created, the creation of a junk profile may be simplified.

In one embodiment, a system includes a search component which comprises a searching application that can be included as part of a computer-readable storage medium. The searching application can be used to provide search results based in part on a user query. For example, a user can input keywords or other search parameters to the search application and the search application can use the search parameters to identify candidate documents. The candidate documents may be ranked and presented to the user according, in part, using junk profile(s).

FIG. 1 is a block diagram of a system 100 which includes indexing, searching, and other functionality. For example, the system 100 can include indexing, searching, and other applications that can be used to index information as part of an indexed data structure and search for relevant data using the indexed data structure. As described below, components of the system 100 can be used to rank and return search results based at least in part on one or more junk scores for the documents. A user can submit queries to the search component 102 using a user interface 103, such as a browser or search window for example.

As shown in FIG. 1, the system 100 includes a search component 102, such as a search engine for example, that can be configured to return results based in part on a query input. For example, the search component 102 can operate to use a word, words, phrases, and other data to locate candidate documents. The search component 102 can operate to locate information and can be used by an operating system (OS), file system, web-based system, or other system. The search component 102 can also be included as an add-in component, wherein the searching functionality can be used by a host system or application. As described further herein, the search component 102 may also use junk scores as ranking features to rank candidate documents.

The search component 102 can be configured to provide search results (uniform resource locaters (URLs) for example) that may be associated with documents. For example, the search component 102 may use text, property information, formatting, and/or metadata when returning search results associated with local files, remotely networked files, combinations of local and remote files, etc. In one embodiment, the search component 102 can interact with a file system, virtual web, network, or other information source when providing search results.

The search component 102 includes a ranking component 104 that can be configured to rank search results (such as candidate documents) based at least in part on a ranking algorithm 106 and one or more ranking features 108. In one embodiment, the ranking algorithm 106 can be configured to provide a number or other variable that can be used for sorting purposes by the search component 102. The ranking features 108 can be described as basic inputs or raw numbers that can be used when identifying relevance of a search result. The ranking features 108 can be collected, stored, and maintained in a database component 110.

Alternatively, ranking features 108, such as junk scores, can be stored and maintained in a dedicated store, including local, remote, and other storage mediums. One or more of the ranking features 108 can be input to the ranking algorithm 106, and the ranking algorithm 106 can operate to rank search results as part of a ranking determination. As described below, in one embodiment, the ranking component 104 can use one or more ranking features 108 as part of the ranking determination.

Correspondingly, the search component 102 can use the ranking component 104 and associated ranking algorithm 106 when using one or more of the ranking features 108 as part of a ranking determination to provide search results. Search results can be provided based on a relevance ranking or some other ranking. For example, the search component 102 can render the search results from most relevant to least relevant based at least in part on the relevance determination provided by the ranking component 104 using one or more of the ranking features 108, including junk scores.

With continuing reference to FIG. 1, the system 100 also includes an index component 112 that can be used to index information. The index component 112 can be used to index and catalog information to be stored in the database component 110. Moreover, the index component 102 can use the metadata, content, and/or other document data when indexing against a number of disparate information sources. For example, the index component 112 can be used to build an inverted index data structure that maps keywords and other document data to documents, including URLs associated with documents.

The search component 102 can use the indexed information when returning relevant search results, such as candidate documents, according to the ranking provided by the ranking component 104. In an embodiment, as part of a search, the search component 102 can be configured to identify a set of candidate documents that contain a portion or all of a user's query information, such as keywords and phrases for example. For example, query information may be located in a document's body or metadata, or additional metadata associated with a document that can be stored in other documents or data stores (such as anchor text for example). As described below, rather than returning an entire set of search results if the set is large, the search component 102 can use the ranking component 104 to rank the candidates with respect to relevance or some other criteria, and return a subset of the entire set based at least in part on the ranking determination. However, if the set of candidates is not too large, the search component 102 can operate to return the entire set.

In an embodiment, the ranking component 104 can use the ranking algorithm 106 to order candidate documents associated with a particular query according to relevance. For example, the ranking algorithm 106 can calculate a rank value associated with a candidate search result, wherein a higher rank value corresponds with a more relevant candidate. Multiple features, including one or more ranking features 108 (such as junk scores), can be input into the ranking algorithm 106 which can then compute an output that enables the search component 102 to sort candidates by a rank or some other criteria. The search component 102 can use the ranking algorithm 106 to prevent the user from having to inspect an entire set of candidates, such as enterprise URL collections for example, by limiting a set of candidates according to rank.

In embodiments, the search component 102 calculates and selects one or more junk scores for candidate documents as part of a relevance determination when returning candidate documents. Candidate documents may have zero or more junk scores associated with them and ranking of candidate documents using junk scores may include averaging, ignoring, or finding the maximum or minimum among a set of junk scores for a candidate document.

In one embodiment, the search component 102 can use the functionality of an integrated server platform, such as MICROSOFT OFFICE SHAREPOINT SERVER® system, to calculate, collect, store, and update junk scores and other ranking features 108 that can be used as part of a ranking determination. The functionality of the server platform can include web content management, enterprise content services, enterprise search, shared business processes, business intelligence services, and other services. For example, as will be described herein, templates created using the MICROSOFT OFFICE SHAREPOINT SERVER® system, can be used to collect reference information for known junk documents.

As described below, a two layer neural network can be used as part of a relevance determination. In one embodiment, the implementation of the two layer neural network includes a training phase and a ranking phase as part of a forward propagation process using the two layer neural network. LambdaRank can be used as a training algorithm during the training phase, and a neural net forward propagation model can be used as part of the ranking determination (see C. Burges, R. Ragno, Q. V. Le, "Learning To Rank With Nonsmooth Cost Functions" in Schölkopf, Platt and Hofmann (Ed.) Advances in Neural Information Processing Systems 19, Proceedings of the 2006 Conference, (MIT Press, 2006), incorporated by reference in its entirety herein). For example, a standard neural net forward propagation model can be used as part of the ranking phase. One or more junk scores can be used as ranking features 108 in conjunction with the two layer neural network as part of ranking candidate documents based on a user query.

In an embodiment, the ranking component 104 utilizes a ranking algorithm 106 which comprises a two layer neural network scoring function (also referred to herein as a "scoring function") which includes:

$$\text{Score}(x_1, \ldots, x_n) = \left(\sum_{j=1}^{m} h_j \cdot w2_j\right) \quad (1)$$

wherein, $$h_j = \tanh\left(\left(\sum_{i=1}^{n} x_i \cdot w_{ij}\right) + t_j\right) \quad (1a)$$

wherein,
$h_j$ is an output of hidden node j,
$x_i$ is an input value from input node i, such as one or more ranking feature inputs,
$w2_j$ is a weight to be applied to a hidden node output,
$w_{ij}$ is a weight to be applied to input value x, by hidden node j,
$t_j$ is the threshold value for hidden node j,
and, tan h is the hyperbolic tangent function:

$$h_j = \tanh\left(\left(\sum_{i=1}^{n} x_i \cdot w_{ij}\right) + t_j\right) \quad (1c)$$

In an embodiments, other functions having similar properties and characteristics as the tan h function can be used above. In embodiments, the variable x, can represent one or more junk scores or other ranking features. A X-rank training algorithm can be used to train the two-layer neural network scoring function before ranking as part of a relevance determination. Moreover, new features and parameters can be added to the scoring function without significantly affecting a training accuracy or training speed.

One or more ranking features 108 can be input and used by the ranking algorithm 106, the two layer neural network scoring function for this embodiment, when making a relevance determination when returning search results based on a user query. In embodiments, one or more junk scores can be input and used as ranking features 108 by the ranking algorithm 106 when making a relevance determination as part of returning search results based on a user query.

Other features can also be used when ranking and providing search results. In an embodiment, click distance (CD), URL depth (UD), file type or type prior (T), language or language prior (L), metadata, BM25F, and/or other ranking features can be used to rank and provide search results. Additional details regarding use of a two-layer neural network to rank search results based upon ranking features (including transformation and normalization of ranking features), are provided in U.S. patent application Ser. No. 11/874,579, filed Oct. 18, 2007, entitled "Ranking and Providing Search Results Based in Part on a Number of Click Through Parameters," and U.S. patent application Ser. No. 11/874,844, filed Oct. 18, 2007, entitled "Enterprise Relevancy Ranking Using a Neural Network," now U.S. Pat. No. 7,840,569, both of which applications are incorporated by reference herein in their entirety. In embodiments, other types of ranking algorithms 106 can be employed. For example, one or more of these (or additional) ranking features 108, including junk scores, can also be used as part of a linear ranking determination or other ranking algorithm 106 employed by ranking component 104.

Figure 2:
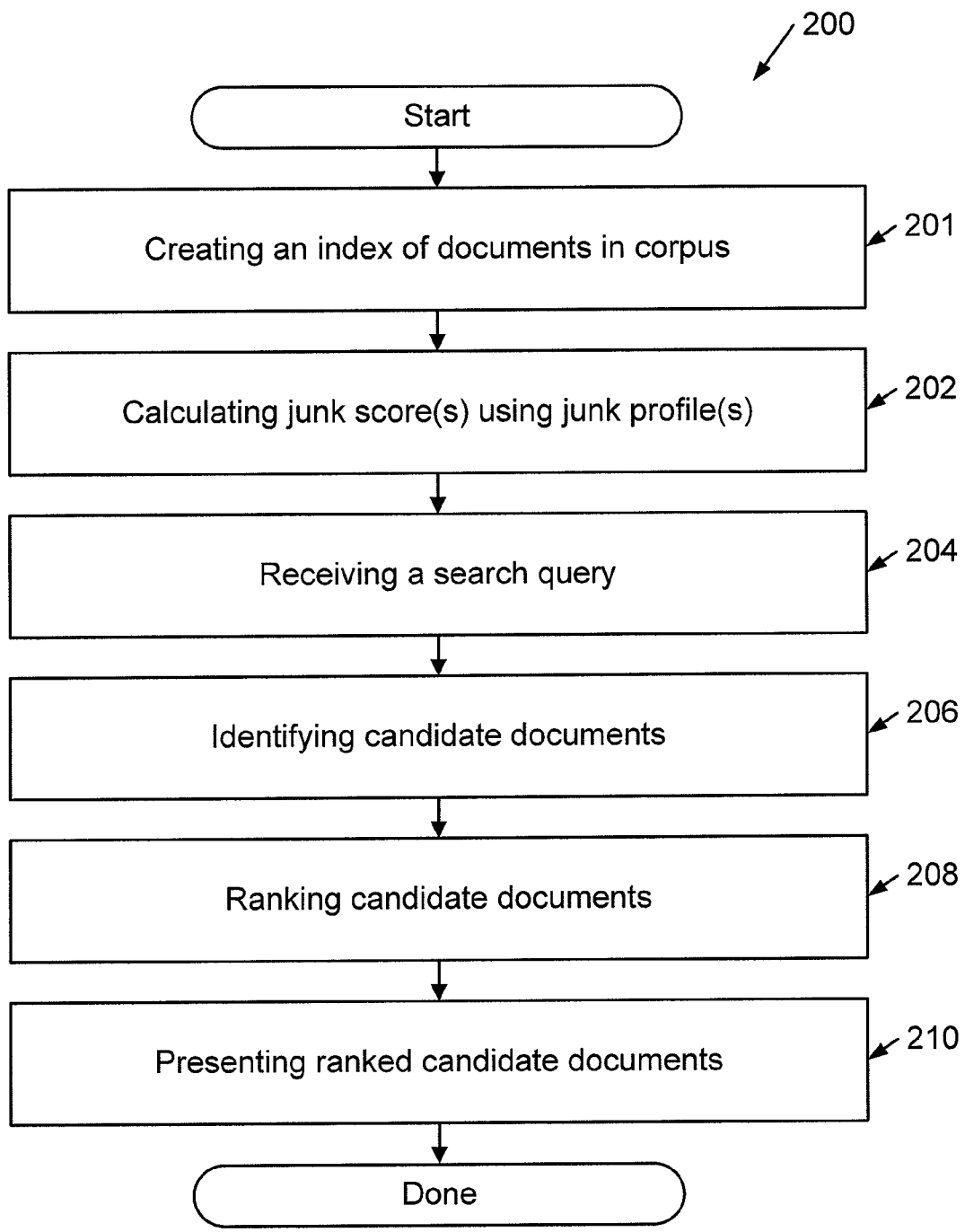
FIG. 2 illustrates a method for ranking search results in accordance with the present disclosure.

FIG. 2 illustrates an embodiment of a method 200 for determining and using junk scores as ranking features in ranking candidate documents in response to a search query. In embodiments, the steps of the method 200 illustrated in FIG. 2 and other figures herein may be performed in a different order, and steps may be added, eliminated, or combined. The method of FIG. 2 may be performed by a system, such as system 100. At step 201, an index of documents in a corpus is created. In embodiments, the index is an inverted index that maps document data to documents within a corpus. As used herein, document data may include words, numbers, phrases, text, formatting, metadata, and other human-readable and non-human-readable data within a document. In addition, a corpus may be any collection of documents that is crawled to create the index. As used herein, documents include word processing documents, spreadsheets, web sites, lists, document libraries, webs, presentations or other files. The corpus may be defined by a collection of files within a specific network (Internet, extranet, or otherwise), site, or other grouping. In embodiments, the present system and methods may be used advantageously to identify probable junk documents within a corpus that employs particular templates for creation of documents. For example, the MICROSOFT OFFICE SHAREPOINT SERVER® system includes standard document templates and permits users to define document templates specific to their MICROSOFT OFFICE SHAREPOINT SERVER® environment.

Figure 3:
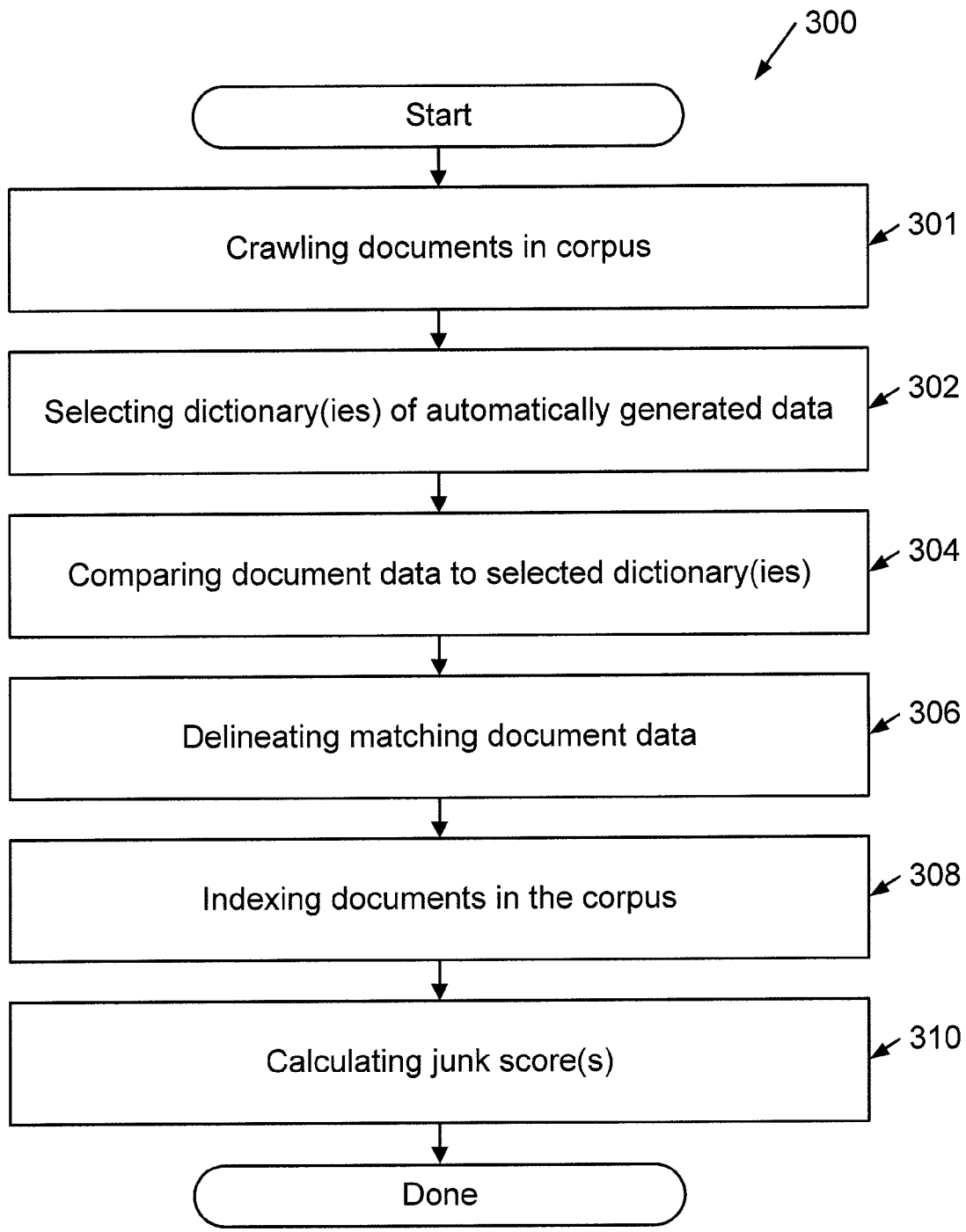
FIG. 3 illustrates a method for creating an index in accordance with the present disclosure.

FIG. 3 illustrates an embodiment of a method 300 for creating the index in step 201, which may be performed, in embodiments, by an indexing component of a system, such as index component 112. In this embodiment, the index is created with reference to a dictionary of automatically generated data. At step 301, the corpus of documents is crawled. At step 302, a dictionary of automatically generated data is selected.

The dictionary of automatically generated data may be created, in embodiments, by creating a blank document using a system associated with the corpus. As used herein, "blank" means substantially lacking document data other than document data automatically created and inserted in the document by a system associated with the corpus when the document is created. For example, the MICROSOFT OFFICE SHAREPOINT SERVER® system permits users to define templates for particular document libraries, and a document library may comprise a corpus of documents that can be indexed, queried and ranked as set forth herein. A blank document created with such a template will include certain document data (such as text, formatting, metadata, etc.) that is automatically generated by the MICROSOFT OFFICE SHAREPOINT SERVER® system. The dictionary of automatically generated data, then, can be created by extracting and compiling the document data in the blank document. The dictionary may also be created or augmented by examining some or all of the existing documents in the corpus and identifying document data that is common to a significant percentage of documents in the corpus. The dictionary may include both content and position information for document data extracted from the blank document.

In embodiments, different dictionaries of automatically generated data may be created for different corpuses, for different templates, and for different systems used to generate the blank documents. In addition, a user (such as an administrator) may be provided the ability to create a new dictionary to be used with respect to a particular type of document by permitting the user to specify a particular blank document to be used. For example, a computer readable storage media may be provided that includes predefined templates generated by a particular system, such as the MICROSOFT OFFICE SHAREPOINT SERVER® system. For example, one such predefined template may comprise a contact management template, while a second such predefined template may be a sales lead pipeline template. Dictionaries of automatically generated data for each of these templates may be compiled and preloaded as part of the system. An administrator, however, may customize an existing template or create a new custom template using the system. In embodiments, the administrator may be prompted to (or the system may automatically) generate a blank document using such custom template and compile a dictionary of automatically generated data from such custom template. In this manner, a dictionary of automatically generated data that is specific to a particular document being indexed may be utilized in embodiments as set forth below.

At step 302, at least one dictionary of automatically generated data is selected. As described, more than one dictionary may be available for selection depending on the type of documents in the corpus. In embodiments, if all of the documents in the corpus were created using the same system and employing the same template, then a single dictionary may be selected and used for all of the documents in the corpus. Alternatively, in embodiments, the corpus may include documents created by disparate systems or using different templates, and different dictionaries may be selected for different documents. In addition, in embodiments, a single dictionary may be defined that combines the content and position information of documents that were created using disparate systems or templates across the corpus. In embodiments, the selected dictionary or dictionaries may be considered part of the junk profile.

At step 304, document data for the crawled documents is compared against the selected one or more dictionaries of automatically generated data. In embodiments, the document data for each crawled document is compared against the dictionary (or dictionaries) selected for that document to determine what document information was likely generated automatically by the system (and/or template) that was used to create that crawled document. For example, a system-defined template used to create a document may include the word "Task" automatically in the title of every document created using that template. The word "Task" and its position within the template are included in the dictionary of automatically generated data selected for that document. Upon comparison of the document to the dictionary, the word "Task" in the title of the document may be determined to "match" a corresponding entry in the selected dictionary. As used herein, "match" may comprise exact or substantial correlation of content, position, or both. In addition, in embodiments, matching the document data to the dictionary (or dictionaries) of automatically generated data may be considered calculating a junk score as described herein.

At step 306, document data that matches the selected dictionary of automatically generated data is delineated. In embodiments, such matching document data may be delineated by marking the document or the matching document data in the index, indexing matching document data separately from non-matching document data, ignoring the matching document data and indexing only non-matching document data, or by other methods.

Consider the following simple example. Although this example is provided using textual document data, any document data can be used (e.g., metadata, formatting, non-human readable data, etc.). Given the texts $T_0$="you know what it is"; $T_1$="what is it"; and $T_2$="it is a bird," the following full inverted file index would typically be created (where the pairs of numbers refer to the document number ($T_x$) and the word position). E.g., the word "bird" is in the third document ($T_2$) and it is the fourth word in that document (position 3):

"a": [(2, 2)]
"bird": [(2, 3)]
"is": [(0, 4), (1, 1), (2, 1)]
"it": [(0, 3), (1, 2), (2, 0)]
"know": [(0, 1)]
"what": [(0, 2), (1, 0)]
"you": [(0, 0)]

Now assume that the same dictionary is selected for all three documents, and the selected dictionary includes the word "is" in position 1 (e.g., because a blank document created using the same system and template used to create documents 0, 1, and 2 contained the word "is" in position 1). In embodiments, the word "is" in position 1 matches document data in each of documents 1 and 2. That matching document data may be delineated in several manners. For example, the matching document data from documents 1 and 2 could be ignored in indexing. In this embodiment, the index for the example above would become:

"a": [(2, 2)]
"bird": [(2, 3)]
"is": [(0, 4)]
"it": [(0, 3), (1, 2), (2, 0)]
"know": [(0, 1)]
"what": [(0, 2), (1, 0)]
"you": [(0, 0)]

In this way, the index that will be searched in response to a search query is minimized (for faster searching) and more focused on user-added content (rather than document data added automatically by a system or template used to create the document). In other embodiments, the matching document data could be indexed separately so that subsequent search queries could be run against both the main index (derived from non-matching document data) and a secondary index (derived from matching document data). Accordingly, in embodiments, a ranking algorithm, such as ranking algorithm 106, may weight the appearance of search query terms in the primary index as more important than the appearance of such terms in the secondary index.

At step 308, documents in the corpus are indexed. In embodiments, steps 306 and 308 are combined, and document data that matches the selected dictionary may be delineated as matching by the manner in which such document data (and documents) are indexed (or not indexed) as discussed above.

At step 310, a junk score is calculated for some or all of the crawled documents in the corpus. In embodiments, a junk score is calculated at step 310 that is a function of a similarity metric (such as Kullback-Leibler divergence) between the crawled document and the blank document(s) used to create the selected dictionary of automatically generated data. For example, the similarity metric may comprise a ratio of document data that matches a corresponding entry in the selected dictionary to document data that does not match a corresponding entry in the selected dictionary. A relatively high similarity metric, in embodiments, indicates a document that does not include much document data other than what is in the blank document(s) used to create the selected dictionary. This may be considered an indication that the document is likely "junk" and a corresponding junk score may be assigned to the document and stored as a ranking feature, such as ranking features 108 in database component 110. The junk score may comprise the similarity metric itself or may comprise a function of the similarity metric in order to normalize and use the junk score as a ranking feature.

In embodiments, if the document is compared 304 to more than one selected dictionary, the junk score may be calculated 310 as a function of the average, maximum, minimum or other calculation of similarity metrics for the document against the selected dictionaries. The junk score calculated at step 310 may be used as a ranking feature as provided herein.

Referring back to FIG. 2, at step 202, one or more junk score(s) are calculated using junk profile(s). In embodiments, the calculation of junk score(s) may be done in combination with creating 201 an index of documents in the corpus. For example, as discussed, the similarity metric(s) between a crawled document and the blank document(s) used to create the selected dictionary(ies) of automatically generated data may be used to determine a junk score. In other embodiments, the junk score calculated at step 310 may not be calculated or may be combined with, or used as an additional ranking feature in conjunction with, calculating 202 a junk score using junk variable(s) from the junk profile.

As used in embodiments herein, junk variable may mean a variable that can be used to determine the similarity between a document and a known junk document. For example, as discussed below, in embodiments a junk variable may comprise term frequency. In other embodiments, a junk variable may comprise chunk size. Junk variables may be used individually or may be combined.

Figure 4:
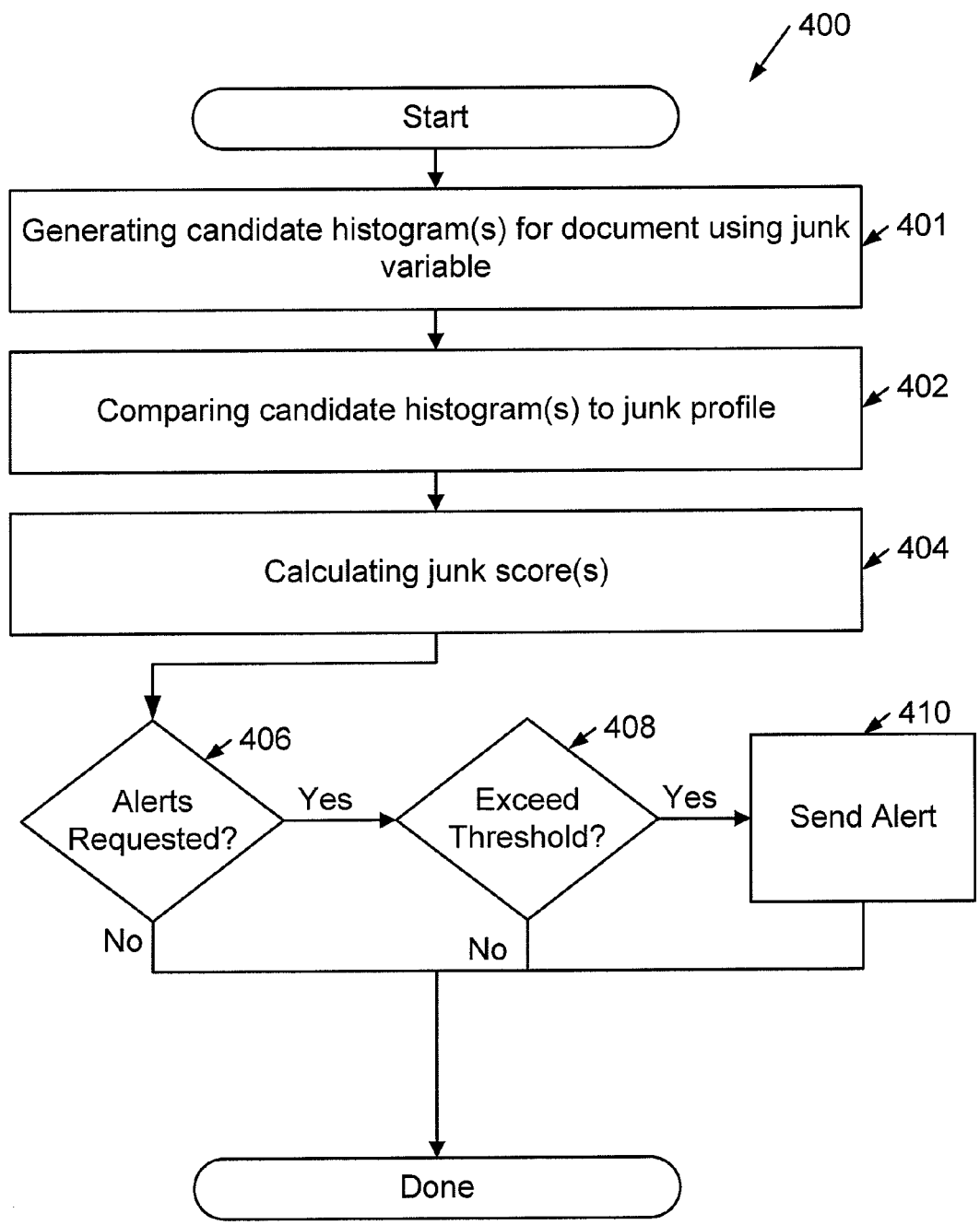
FIG. 4 illustrates a method for calculating junk scores in accordance with the present disclosure.

At step 202, in embodiments, the junk score for a document is calculated as a function of a similarity metric between one or more histograms created for the document and a junk profile, wherein the junk profile comprises one or more histograms for known junk document(s). FIG. 4 illustrates one embodiment of a method 400 for calculating 202 a junk score for a document using one or more junk profile(s).

In embodiments, method 400 is performed for all documents in the corpus while the documents are being indexed at step 201 or otherwise before a search query is received. In other embodiments, method 400 may be performed after a search query is received and candidate documents have been identified. Method 400 is described with respect to one document, however, method 400 may be repeated, for example, for any or all documents in a corpus or for candidate documents identified in response to a search query.

At step 401, in embodiments, at least one histogram is generated for the document based on a junk variable. As used herein, a histogram may be a representation of a variable within defined categories (or bins). In other embodiments, alternative representations of the distribution of a junk variable may be used instead of or in addition to, histograms. For example, a continuous function can be calculated or estimated to represent such distribution without converting it to a histogram. A histogram for a document being analyzed is described herein as a "candidate histogram."

In the example embodiment shown in method 400, at step 401, a candidate histogram is generated for the document. In the following example, the candidate histogram is based on term frequency for the document (e.g., the percentage of the unique terms in the document that have a corresponding frequency of occurrence in the corpus). For example, assume in a simple example that a document includes four terms: T1, T2, T3, and T4. Example total corpus frequencies (i.e., total number of documents in the corpus that contain this term) is shown for each term as follows:

T1: 10
T2: 300
T3: 100,000
T4: 50

A term frequency candidate histogram for this document may be defined in relation to categories, or "bins." In this example, four bins are defined for total corpus frequencies: [1 . . . 20], [21 . . . 400], [401 . . . 12000], [12001 . . . max]. Accordingly, the term frequency candidate histogram for this document may be represented as: [0.25, 0.5, 0.0, 0.25]. This reflects that one out of the four terms falls into the first bin, two of the four terms fall into the second bin, none of the four terms falls into the third bin, and one of the four terms falls into the fourth bin.

At step 402 the candidate histogram is compared to at least one junk profile. In addition to the junk profile(s) described in relation to FIGS. 2 and 3 above, the junk profile may further comprise one or more histograms of known junk document(s). It may also comprise one or more rules that approximate a representation of known junk document(s). "Junk documents" may be defined differently in different embodiments. For example, in some embodiments, junk documents comprise documents that include a large percentage of non-human readable document data versus the document as a whole. In other embodiments, junk documents may comprise documents that are nearly empty. In embodiments, administrators are permitted (e.g., through user interface 103) to define particular existing documents as "known junk" for the purposes of creating reference histogram(s).

For example, with reference to the simple example discussed above with respect to step 401, assume that a known junk document includes the following terms (with total corpus frequencies for each):

T1: 10
T3: 100,000
T5: 500
T6: 1,000
T7: 12

A term frequency reference histogram for this known junk document may be defined in relation to the same categories, or "bins" as the candidate histogram: [1 . . . 20], [21 . . . 400], [401 . . . 12000], [12001 . . . max]. Accordingly, the term frequency reference histogram for this known junk document may be represented as: [0.4, 0.0, 0.4, 0.2]. This reflects that two out of the five terms fall into the first bin, none of the five terms falls into the second bin, two of the five terms fall into the third bin, and one of the five terms falls into the fourth bin.

Comparison 402 of the candidate histogram to the junk profile (in this example, the junk profile comprises a reference histogram), may take many forms. For example, the histograms could be compared by calculating a similarity metric as the distance between the candidate and reference histograms:

$$\text{Similarity Metric} = \sqrt{\sum_{0}^{n}(B1(i) - B2(i))^2}$$

In this example comparison function, B1 is the candidate histogram, B2 is the reference histogram, B1(i) is the value for the candidate histogram for the i'th bin, and B2(i) is the value for the reference histogram for the i'th bin. This calculation yields a similarity metric between 0 and 1.

Referring again to the above example, the comparison step 402 calculates a similarity metric between the candidate and reference histograms as follows:

$$\text{Similarity Metric (B1, B2)} = \sqrt{(.4-.25)^2 + (0.0-.5)^2 + (.4-0.0)^2 + (.2-.25)^2} \approx .66$$

In this example calculation, the more similar the candidate and reference histograms are, the closer the similarity metric is to zero (thus indicating a higher likelihood that the document is junk).

In step 404 at least one junk score is calculated for the document. In embodiments the junk score may comprise the similarity metric itself. In other embodiments, the similarity metric may be converted to a different scale. In addition, the junk profile used in step 402 may include more than one reference histogram. For example, more than one known junk document may be used to create the junk profile. In embodiments, the junk score(s) may comprise a function of an average, weighted average, maximum, minimum or some other function of multiple similarity metrics calculated during the comparison step 402. In addition, more than one junk score for the document may be calculated based on a junk variable, such as term frequency, and all such junk scores may be used by a ranking algorithm, as described further herein. Junk scores may be stored as metadata with the document itself, separate from the document, or otherwise.

At step 406, a determination is made whether alerts have been requested. For example, in embodiments, administrators may request alerts when a junk score is calculated that exceeds a certain threshold. It should be understood that "exceeding a threshold" as used herein may refer to a measurement (such as a junk score) falling above or below a particular threshold, depending on how a particular scale is defined. If alerts have not been requested, method 400 may end (and, in embodiments, control returns to step 204 in FIG. 2). If alerts have been requested, a determination is made 408 whether the calculated junk score(s) exceed a threshold. In embodiments, the threshold is tunable by an administrator. If the threshold has not been exceeded, method 400 may end. If it has been exceeded, then an alert is sent 410. The alert can take different forms, including email, voice message, text, etc. and may be sent to a user, an administrator, etc. In this manner, administrators and others may be alerted to junk documents that may need to be deleted. In addition, junk scores may be employed as a searchable property. For example, a user may wish to search on documents having high junk scores because they may be good candidates for archiving. Another user may wish to use junk scores as search criteria, automatically causing documents with junk scores over a particular threshold to be filtered out from the returned search results. In other embodiments, junk scores may be queried by an administrator or user in order to find documents that are candidates for deletion.

Method 400 is described in relation to using histogram(s) for the document based on one junk variable, however, method 400 may be repeated for histograms using other junk variables. For example, another junk variable that can be used to predict whether a document is junk is "chunk size." Chunk size is the length of continuous text. Some document types, such as spreadsheets, have large amounts of non-human readable data. Other documents, such as word processing documents, may be expected to have longer chunks of continuous text. A histogram based on chunk size for the document may illustrate the distribution of chunk sizes (runs of continuous text) within the document. Depending on the document type, chunks may be measured differently by scanning the text of the document and measuring the distance between logical breaks (such as cells, paragraphs, sentences, page breaks, etc.). In embodiments, similarity between the chunk size distribution within a document to the chunk size distribution in a known junk document is an indicator of whether the document should be characterized as junk.

Similarity metrics between the document and a junk profile based on different histograms and/or junk variables may be combined into a single junk score or used as individual junk scores that are employed as ranking features by ranking algorithm, such as ranking algorithm 106.

Referring again to FIG. 2, the method 200 continues at step 204, where a search query is received. In embodiments, a user may enter a search query using a user interface, such as user interface 103. The search query may include key words, phrases or other search parameters, including non-text search parameters (such as formatting, etc.). At step 206, candidate documents are identified. For example, as described in relation to FIG. 1, a search component, such as search component 102, may return candidate documents that match the search query.

At step 208, the candidate documents are ranked. As described in relation to FIG. 1, the candidate documents may be ranked using a ranking component 104, employing one or more ranking algorithms 106 and one or more ranking features 108. Junk scores, calculated as set forth herein, may be used as ranking features 108. Other ranking features 108 may also be used. In embodiments, the rank of an individual document may thus be affected by the document's junk score(s). As such, a document that would otherwise be highly ranked because it matches search query terms closely may be ranked lower because of a high junk score. In other embodiments, the actual ranking of the documents is unaffected by the junk score. Rather, junk scores are used to provide an indication of possible junk to the user without affecting the order in which the documents are listed. At step 210, the ranked candidate documents are presented. For example, a subset (e.g., the first ten) documents may be displayed to a user in order of their ranking. In embodiments, documents that have a junk score that exceeds a threshold may not be presented at all (e.g., may be eliminated as a candidate document). In other embodiments, a document's junk score is presented along with the candidate document (e.g., in a ranked list of candidate documents) so that a user can make an independent determination whether to click on a document having a particular junk score. In other embodiments, a junk threshold may be used. If a document's junk score exceeds the junk threshold, the document may be displayed with an indication that the document is likely junk. For example, if the junk score exceeds the junk threshold, a junk symbol or the actual junk score may be displayed for the document in the ranked list of candidate documents. As used herein, a displayed junk score or junk symbol shall be considered a "junk status."

In embodiments, the present systems and methods are useful in detecting "accidental junk documents" (as opposed to documents that contain malicious or unwanted information, i.e., "adversarial junk"). For example, a user may have started creating a presentation, inserted a title, saved the presentation without adding any additional content, and then forgotten about it. Ordinarily, in response to a search query containing terms that are used in the title of that presentation, a search component would likely return that presentation and rank it highly. Detecting, however, that the presentation is similar (e.g., has a similar term frequency distribution) to a known junk document, allows a search component to rank the presentation more appropriately.

Figure 5:
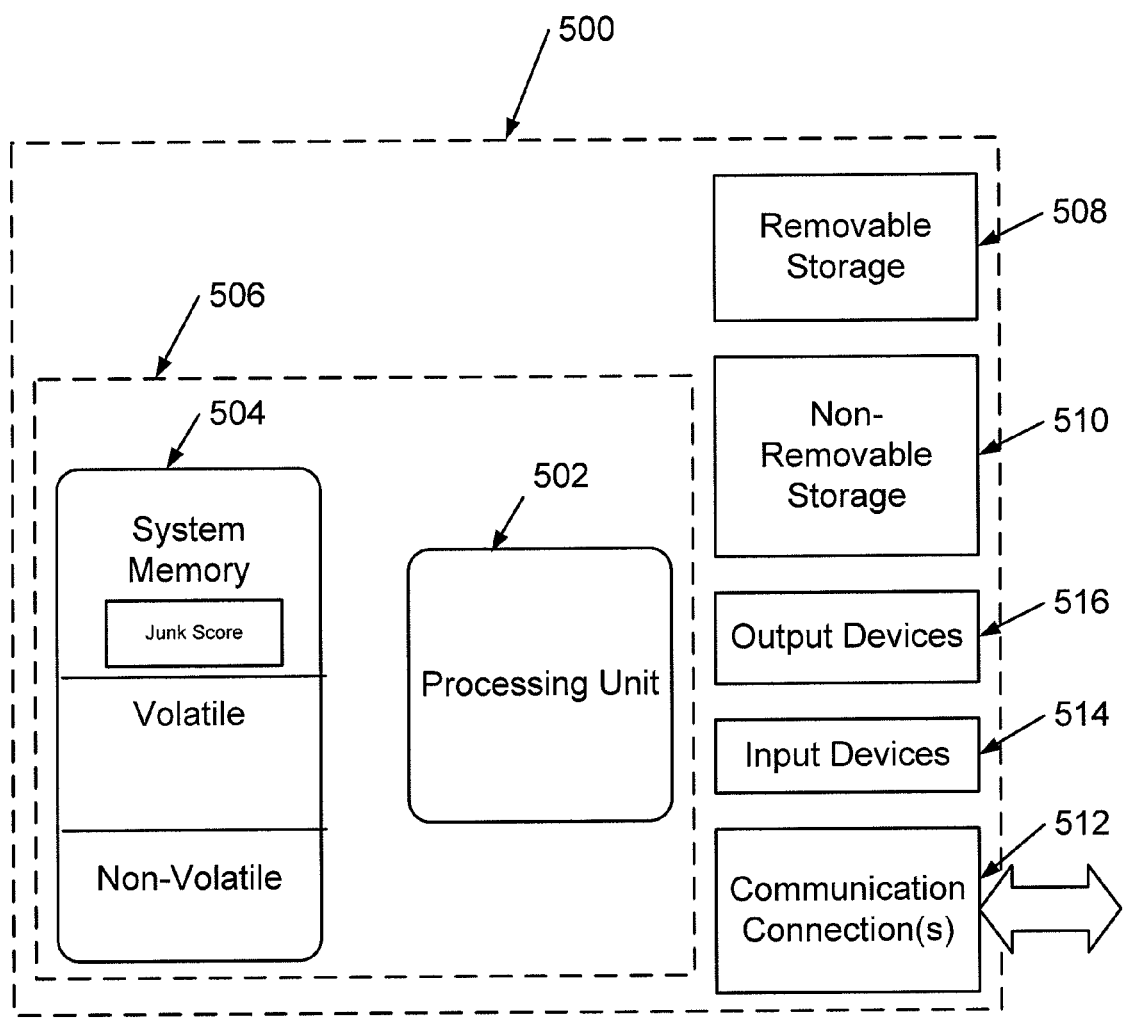
FIG. 5 illustrates an exemplary operating environment in accordance with the present disclosure.

FIG. 5 illustrates one example of a suitable operating environment 500 in which a software embodiment may be implemented. This is only one example of a suitable operating environment and is not intended to suggest any limitation as to the scope of use or functionality. Other well known computing systems, environments, and/or configurations that may be suitable for use include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, junk scores calculated as described herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above. The logical connections may include any method supported by available communications media. Such networking environments are commonplace in offices, enterprise-wide computer networks, intranets and the Internet.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A computer-implemented method for ranking candidate documents in response to a search query, comprising steps of:
   creating, by at least a first processor, an index of a plurality of documents in a corpus;
   calculating a junk score for at least a first document in the corpus, wherein calculating the junk score comprises:
      using a first candidate histogram for the first document in the corpus, wherein the first candidate histogram is specific to the first document; and
      using a junk profile, wherein the junk profile comprises:
         a first reference histogram for a first known junk document, wherein the first reference histogram is specific to the first known junk document and is based on a first junk variable; and
         comparing the first candidate histogram to the first reference histogram;
   receiving a search query;
   identifying, based on the search query and the index, candidate documents from the plurality of documents in the corpus, wherein the candidate documents include at least the first document;
   ranking the candidate documents.

2. The computer-implemented method of claim 1, wherein ranking the candidate documents comprises ranking the candidate documents based at least in part on the junk score for the first document, and wherein the ranking of the first document is decreased where the first document is more similar to the first known junk document.

3. The computer-implemented method of claim 1, wherein calculating the junk score further comprises determining a first similarity metric.

4. The computer-implemented method of claim 3, wherein the junk profile comprises a second reference histogram for the first junk variable of a second known junk document, and wherein calculating the junk score comprises comparing the candidate histogram to the second reference histogram to determine a second similarity metric.

5. The computer-implemented method of claim 4, wherein calculating the junk score comprises at least one of: calculating a maximum of the first and second similarity metrics and calculating an average of the first and second similarity metrics.

6. The computer-implemented method of claim 1, further comprising the step of displaying the ranked candidate documents and displaying a junk status for at least the first document.

7. The computer-implemented method of claim 1, wherein the first junk variable comprises chunk size.

8. The computer-implemented method of claim 1, wherein: the junk profile comprises a dictionary of automatically generated data, and wherein creating the index comprises ignoring document data that matches the automatically generated data.

9. The computer-implemented method of claim 1, wherein:
the junk profile comprises a dictionary of automatically generated data;
calculating the junk score further comprises comparing document data from the plurality of documents in the corpus to the dictionary of automatically generated data; and
creating the index comprises delineating in the index document data that matches the automatically generated data.

10. The computer-implemented method of claim 9, wherein identifying the candidate documents includes comparing the search query to document data in the index, and wherein ranking the candidate documents includes determining whether document data matching the search query has been delineated as matching the automatically generated data.

11. The computer-implemented method of claim 9, wherein calculating the junk score for the first document comprises determining a similarity metric between document data in the first document and the automatically generated data.

12. The computer-implemented of claim 9, further comprising:
creating the junk profile, comprising creating the dictionary of automatically generated data by:
creating a blank template containing automatically generated data; and
extracting the automatically generated data from the blank template.

13. The computer-implemented method of claim 1, wherein the step of calculating includes calculating a junk score for a second document in the corpus and wherein the step of identifying comprises excluding the second document from the candidate documents when the junk score for the second document exceeds a predetermined threshold.

14. The computer-implemented method of claim 1, wherein the step of calculating occurs after the step of identifying and wherein the step of calculating comprises calculating a junk score for a plurality of the candidate documents.

15. The computer-implemented method of claim 1, wherein the corpus is an intranet, the plurality of documents is created using a particular template, and the junk profile is specific to the particular template.

16. The computer-implemented method of claim 1, wherein the search query comprises a query for documents in the corpus that have a junk score that exceeds a predetermined threshold.

17. The computer-implemented method of claim 1, wherein the junk score for the first document exceeds a predetermined threshold, further comprising:
sending to an administrator a message identifying the first document as junk.

18. A system for ranking candidate documents in response to a search query, comprising:
at least one processor;
a memory, operatively connected to the at least one processor and containing instructions that, when executed by the at least one processor, perform a method comprising:
creating an index of a plurality of documents in a corpus;
calculating a junk score for at least a first document in the corpus, wherein calculating the junk score comprises:
using a first candidate histogram for the first document in the corpus, wherein the first candidate histogram is specific to the first document; and
using a junk profile, wherein the junk profile comprises:
a first reference histogram for a first known junk document, wherein the first reference histogram is specific to the first known junk document and is based on a first junk variable; and
comparing the first candidate histogram to the first reference histogram;
receiving a search query;
identifying, based on the search query and the index, candidate documents from the plurality of documents in the corpus, wherein the candidate documents include at least the first document;
ranking the candidate documents based at least in part on the junk score for the first document;
wherein creating the index comprises separately delineating document data from the plurality of documents if the document data matches the junk profile.

19. The system of claim 18, wherein the method further comprises:
creating, for at least the first document, a candidate histogram for at least a first junk variable;
wherein calculating the junk score comprises comparing the candidate histogram to the first reference histogram to determine a first similarity metric;
wherein the junk profile comprises a dictionary of automatically generated data;
wherein calculating the junk score further comprises comparing document data from the plurality of documents in the corpus to the dictionary of automatically generated data; and
wherein creating the index comprises delineating in the index document data that matches the automatically generated data.

20. A computer storage medium including computer-executable instructions that, when executed by at least one processor, perform a method comprising:
creating an index of a plurality of documents in a corpus;
creating, for at least a first document of the plurality of documents, a candidate histogram specific to the first document for at least a first junk variable;
calculating a junk score for at least the first document using a junk profile, wherein:
the junk profile comprises:
a first reference histogram for a first known junk document, wherein the first reference histogram is specific to at least the first known junk document and is based on the first junk variable, and
a dictionary of automatically generated data; and
calculating a junk score comprises at least (a) comparing the candidate histogram to the first reference histogram to determine a first similarity metric and (b) determining a second similarity metric between document data in the first document and the dictionary of automatically generated data;

receiving a search query;

identifying, based on the search query and the index, candidate documents from the plurality of documents in the corpus, wherein the candidate documents include at least the first document;

ranking the candidate documents based at least in part on the junk score for the first document.

* * * * *